US012317791B2

(12) United States Patent
Ingram-Tedd et al.

(10) Patent No.: US 12,317,791 B2
(45) Date of Patent: Jun. 3, 2025

(54) STORAGE, GROWING SYSTEMS AND METHODS

(71) Applicant: Ocado Innovation Limited, Hatfield (GB)

(72) Inventors: Andrew Ingram-Tedd, Hatfield (GB); Lars Sverker Ture Lindbo, Hatfield (GB); James Lloyd-Jones, Hatfield (GB); Matthew Whelan, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 21 days.

(21) Appl. No.: 17/783,551

(22) PCT Filed: Dec. 8, 2020

(86) PCT No.: PCT/EP2020/085110
§ 371 (c)(1),
(2) Date: Jun. 8, 2022

(87) PCT Pub. No.: WO2021/116116
PCT Pub. Date: Jun. 17, 2021

(65) Prior Publication Data
US 2023/0000029 A1  Jan. 5, 2023

(30) Foreign Application Priority Data
Dec. 9, 2019 (GB) .................. 1918020

(51) Int. Cl.
*A01G 31/06* (2006.01)
*A01G 7/04* (2006.01)
(Continued)

(52) U.S. Cl.
CPC ............ *A01G 31/06* (2013.01); *A01G 7/045* (2013.01); *A01G 31/045* (2013.01); *G05B 15/02* (2013.01); *A01G 31/065* (2025.01)

(58) Field of Classification Search
CPC ...... A01G 31/06; A01G 7/045; A01G 31/045; A01G 2031/006
See application file for complete search history.

(56) References Cited

U.S. PATENT DOCUMENTS 2,701,065 A   2/1955  Bertel
4,759,451 A * 7/1988  Apps ............... B65D 21/041
                                                     206/505

(Continued)

FOREIGN PATENT DOCUMENTS

CN     102919114 A    2/2013
CN     205695044 U    11/2016
(Continued)

OTHER PUBLICATIONS

International Search Report (PCT/ISA/210) and Written Opinion (PCT/ISA/237) mailed on Mar. 15, 2021, by the European Patent Office as the International Searching Authority for International Application No. PCT/EP2020/085106. (17 pages).

(Continued)

Primary Examiner — Brady W Frazier
Assistant Examiner — Edgar Reyes
(74) Attorney, Agent, or Firm — Buchanan Ingersoll & Rooney PC

(57) ABSTRACT

Storage, growing system and methods for storing, germinating, propagating and or growing living organisms, exemplary systems including stackable growth tray(s) containing: a drainage system, the drainage system including: an inclined growing surface, inclined in a direction to at least one drainage hole; a drainage routing structure positioned over the at least one drainage hole, and having a down-pipe and a connecting routing pipe, wherein the down-pipe is for receiving fluid from an adjacent-above stackable item and transmitting the fluid to an adjacent-below down-pipe or a drain-pipe, and the connecting routing pipe is for receiving (Continued)

fluid from an adjacent-above drainage hole and routing the fluid to the down-pipe, and wherein fluid propagating from the inclined growing surface or an adjacent-above stackable item is directed through the growth tray to a down-steam point in the drainage system.

31 Claims, 19 Drawing Sheets

(51) Int. Cl.
    *A01G 31/02*     (2006.01)
    *A01G 31/04*     (2006.01)
    *G05B 15/02*     (2006.01)

(56) References Cited

U.S. PATENT DOCUMENTS

| | | | |
|---|---|---|---|
| 5,865,144 | A | 2/1999 | Semenuk et al. |
| 6,016,627 | A * | 1/2000 | Nobile .................... A01G 18/62 47/1.1 |
| 6,182,394 | B1 * | 2/2001 | Bassler .................. A01G 27/06 47/75 |
| 9,015,992 | B1 * | 4/2015 | Livingston .............. E02B 3/125 47/65.9 |
| 10,136,587 | B1 | 11/2018 | Johnson et al. |
| 10,806,131 | B2 | 10/2020 | Hori |
| 11,116,156 | B2 | 9/2021 | Volpe et al. |
| 11,612,111 | B1 * | 3/2023 | Kung ...................... A01G 31/04 47/63 |
| 11,849,682 | B2 | 12/2023 | Lloyd-Jones et al. |
| 2001/0039758 | A1 * | 11/2001 | Fan .......................... A01G 9/04 47/80 |
| 2004/0016177 | A1 * | 1/2004 | Weder .................... A47G 7/085 47/50 |
| 2005/0241591 | A1 | 11/2005 | Ingley et al. |
| 2010/0242852 | A1 | 9/2010 | Conger et al. |
| 2014/0069002 | A1 | 3/2014 | Morgan et al. |
| 2015/0201563 | A1 * | 7/2015 | Chiang .................. A01G 9/022 47/86 |
| 2015/0282444 | A1 * | 10/2015 | Butler .................... A01G 31/06 47/62 C |
| 2015/0296726 | A1 | 10/2015 | Higgins |
| 2016/0360712 | A1 | 12/2016 | Yorio et al. |
| 2018/0077885 | A1 | 3/2018 | Jun et al. |
| 2018/0092337 | A1 | 4/2018 | Hori |
| 2019/0230787 | A1 | 7/2019 | Jo et al. |
| 2021/0105960 | A1 | 4/2021 | Yukawa |
| 2021/0360888 | A1 * | 11/2021 | Farmer ............... B05B 17/0615 |
| 2023/0000030 | A1 | 1/2023 | Ingram-Tedd et al. |

FOREIGN PATENT DOCUMENTS

| | | | |
|---|---|---|---|
| CN | 107637499 | A | 1/2018 |
| CN | 107667845 | A | 2/2018 |
| CN | 207461071 | U | 6/2018 |
| CN | 208924892 | U | 6/2019 |
| CN | 210406551 | U | 4/2020 |
| EP | 0767113 | B1 | 7/2002 |
| EP | 1037828 | B1 | 9/2003 |
| EP | 2499908 | A1 | 9/2012 |
| FR | 1271294 | A | 9/1961 |
| GB | 2577973 | A | 4/2020 |
| KR | 20150000853 | U | 2/2015 |
| KR | 20190041741 | A | 4/2019 |
| NO | 317366 | B1 | 10/2004 |
| WO | 8500269 | A1 | 1/1985 |
| WO | 2005053378 | A1 | 6/2005 |
| WO | 2011084312 | A1 | 7/2011 |
| WO | 2014018265 | A2 | 1/2014 |
| WO | 2015019055 | A1 | 2/2015 |
| WO | 2016166311 | A1 | 10/2016 |
| WO | 2017138269 | A1 | 8/2017 |
| WO | 2018027049 | A1 | 2/2018 |
| WO | 2019003201 | A2 | 1/2019 |
| WO | 2019077575 | A1 | 4/2019 |
| WO | 2019198133 | A1 | 10/2019 |
| WO | 2021116115 | A1 | 6/2021 |

OTHER PUBLICATIONS

International Search Report (PCT/ISA/210) and Written Opinion (PCT/ISA/237) mailed on May 10, 2021, by the European Patent Office as the International Searching Authority for International Application No. PCT/EP2020/085110. (19 pages).

Patents Act 1977: Combined Search and Examination Report under Sections 17 and 18(3) dated May 20, 2021 issued in corresponding Great Britain Patent Application No. GB2019314.0 by the United Kingdom Intellectual Property Office. (6 pages).

Patents Act 1977: Examination Report under Section 18(3) dated Dec. 20, 2021 issued in corresponding Great Britain Patent Application No. GB2019291.0 by the United Kingdom Intellectual Property Office. (6 pages).

Patents Act 1977: Examination Report under Section 18(3) dated Mar. 24, 2022 issued in corresponding Great Britain Patent Application No. GB2019291.0 by the United Kingdom Intellectual Property Office. (3 pages).

Patents Act 1977: Search Report under Section 17(5) dated Jun. 10, 2020 issued in corresponding Great Britain Patent Application No. GB1918018.1 by the United Kingdom Intellectual Property Office. (5 pages).

Patents Act 1977: Search Report Under Section 17(5) dated Jun. 10, 2020 issued in corresponding Great Britain Patent Application No. GB1918020.7 by the United Kingdom Intellectual Property Office. (4 pages).

Office Action (Examination Report No. 3) issued on Jul. 10, 2024, by the Australian Patent Office in corresponding Australian Patent Application No. 2020399175. (6 pages).

Office Action issued on Jul. 19, 2024, by the U.S. Patent and Trademark Office in U.S. Appl. No. 17/783,583. (12 pages).

Office Action (Examination Report No. 2) issued on Jun. 5, 2024, by the Australian Patent Office in corresponding Australian Patent Application No. 2020399175. (4 pages).

Office Action (Examination Report No. 1) issued on Aug. 14, 2023, by the Australian Patent Office in corresponding Australian Patent Application No. 2020403087. (4 pages).

Office Action (Communication) issued on Oct. 21, 2024, by the European Patent Office in corresponding European Patent Application No. 20 820 923.9. (10 pages).

Office Action issued on Feb. 18, 2025, by the U.S. Patent and Trademark Office in co-pending U.S. Appl. No. 17/783,583. (12 pages).

* cited by examiner

STORAGE, GROWING SYSTEMS AND METHODS

The present invention relates to storage systems. More specifically but not exclusively the present invention relates to storage systems for growing living organisms.

Conventional systems and methods for growing certain crops are well known. Most require large areas of land and need to be positioned in appropriate locations for the conditions required for the crops to be grown.

More recently, advanced farming techniques such as hydroponics have led to the ability to grow high quality crops indoors with very high utilisation of lighting, water and fertiliser. However, these systems have been less efficient in terms of land use, capital and labour.

The present disclosure describes systems and methods for improving the efficiency of these types of techniques.

Some commercial and industrial activities require systems that enable the storage and retrieval of a large number of different products. One known type of system for the storage and retrieval of items in multiple product lines involves arranging storage containers or containers in stacks on top of one another, the stacks being arranged in rows. The storage containers or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. EP'113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in EP'113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. Robotic load handling devices can be controllably moved around the stack on a system of tracks on the upper most surface of the stack.

Other forms of robotic load handling device are further described in, for example, Norwegian patent number 317366, the contents of which are incorporated herein by reference.

A further development of load handling device is described in PCT publication WO 2015/019055 A1 (Ocado Innovation Limited) where each robotic load handler only covers one grid space, thus allowing higher density of load handlers and thus higher throughput of a given size system.

In such known storage systems a large number of containers are stacked densely. The containers are conventionally used to store goods to supply online grocery orders picked by robots.

Storage systems are known to be used for growing living organisms using hydroponic methods. As mentioned above, but now in more detail, hydroponics is a method of growing plants without soil by instead using mineral nutrient solutions in a water solvent. Plants typically grown in soil or land may be grown with their roots exposed to the nutritious liquid, or the roots may be physically supported by a medium such as perlite, Rockwool™, vermiculite, coco fibre, sand or gravel. The nutrients used in hydroponic systems can come from an array of different sources. The delivery frequency of nutrients is governed by parameters such as plant size, plant growing stage, climate, substrate, and substrate conductivity, pH, and water content.

In connection with growing crops for consumptions, pyrrolizidine alkaloids (PAs) are a group of chemicals that can be naturally occurring in plants as a defense mechanism against insects, other pests or microbiological hazards. Some PAs exhibit hepatotoxicity that is damaging to the liver. Therefore PAs may be subject to regulation in food and particularly in herbs and medicines because a build-up of these chemicals in the body can represent a health risk. PAs can be particularly prevalent in crops such as medicinal herbs so there is a need to minimise the level of PAs found in crops.

In hydroponic growing systems the quantity of water required to grow a crop to harvest is greatly reduce compared with soil-based agriculture. In a run-to-waste system, sometimes referred to as "The Bengal System", nutrient and water solution is periodically applied to the medium surface. Nutrient-rich waste may be collected and re-used in the system.

A development of a growing system and method is described in PCT publication WO2016/166311A1 (Ocado Innovation Limited) where plants are grown in containers and the containers are stored in stacks. Within individual containers, services are provided for enabling plants to grow. Load handing devices are used to take containers from the stack and deposit them in alternative locations.

UK application GB1911505.4 (Ocado Innovation Limited) "Hydroponics Growing System and Method" disclose another hydroponic growing system. Seeds are pre-treated and germinated in a 'high-care' portion to reduce contamination during germination. Seedlings are then moved to a growing room in support vehicles containing growing trays move along a frame or rack as the crop grows and until the crop is ready for harvesting. The system disclosed includes illumination apparatus above each growing station, and a recirculating irrigation system for providing nutrients to a growing crop. The irrigation system uses mains water blended with nutrients, which is pumped to the growing crop. Water which drains from the racks is reintroduced to the water blend to minimise waste water.

The present invention aims to further develop the systems and methods of growing living organisms or crops. An aim of the present invention is to maximise the quality and yield of the crop. Further, an aim of the present invention is to improve efficiency in terms of use of assets, resources and services required by the crop.

SUMMARY

Aspects of the invention are set out in the accompanying claims.

Hydroponic system, growth trays, light boxes, growth tray systems, and methods for storing, germinating, propagating and or growing living organisms are provided.

A growth tray for storing, germinating, propagating and or growing living organisms, wherein the growth tray is a stackable item and comprises: a drainage system, the drainage system comprising: an inclined growing surface, inclined in a direction to at least one drainage hole; a drainage routing structure positioned over the at least one drainage hole, and having a down-pipe and a connecting routing pipe, wherein the down-pipe is for receiving fluid from an adjacent-above stackable item and transmitting the fluid to an adjacent-below down-pipe or a drain-pipe, and the connecting routing pipe is for receiving fluid from an adjacent-above drainage hole and routing the fluid to the down-pipe, and wherein fluid propagating from the inclined growing surface or an adjacent-above stackable item is directed through the growth tray to a down-steam point in the drainage system is provided.

The inclined growing surface may comprise a plurality of ribs providing a plurality of drainage channels therebetween. The growth tray may further comprise a drainage gutter, substantially centrally located, and the inclined growing surface comprises opposed first and second surfaces directed to drain into the drainage gutter; or wherein the drainage gutter is located along one edge or side of the growth tray and the inclined growing surface comprises a single surface directed to drain into the gutter.

In this way a growth tray with an integrated or built-in drainage system is provided. The incline or slop of the tray ensures that there is no resting or standing fluid when the growth tray has finished draining. The arrangement may help to efficiently recycle fluid within the system, returning the fluid through the drain system to be filtered and remixed to properly balance the proportion of nutrients in the water for re-use in the system on the same. The integrated tray drainage system originates from the growing surface itself and continues directly to a main drain. As a result there is no need for additional pipes between the growth tray and the main drain to act as a conduit for run-off fluid. Thereby, the drainage/growth tray with integrated drainage ensures efficient use of water and nutrients as delivered to the growth surface and required by a crop of living organisms. In turn this may help to reduce the costs of resources for running a hydroponic system and reduce the environmental impact of a hydroponic system. Further, the length of drainage system may be reduced, and as a result proportionately reducing the amount of equipment that requires cleaning.

Further, as fluid from an adjacent-above drainage hole is routed directly into the down-pipe of an adjacent-above stackable item, contamination from overflow or run-off fluid from an above growth tray to a below growth tray may be avoided. Still further, the internal drainage system from the inclined surfaces and into the drain pipe system may reduce over splash from the growth trays on to other growth trays in the system thereby reducing cross-contamination between growth trays and reducing the amount of required cleaning.

The growth tray may be arranged in a stack with a plurality of stackable items. In some arrangements, the growth tray may further comprise: a body; and two or more stacking legs protruding from a lower surface of the body and arranged around the perimeter of the body, wherein at least one of the two or more stacking legs is located below the drainage routing structure and wherein the down-pipe extends through the at least one stacking leg. The stacking legs may be located at each corner and at a mid-point of the body.

The growth tray further may comprise one or more a structure for lifting the growth tray. The lifting structure may be a feature of the drainage routing structure, may be a feature of the growth tray body, or located at one or more corner(s) of the growth tray. The body of the growth tray may further comprise: reinforcement rods, wherein the reinforcement rods are encased within the body of the growth tray.

In this way, the growth trays may be stacked with like growth trays or other items and may be moved around within a hydroponic system. This assists in using the space within the hydroponic system efficiently. Further, it allows growth trays to be moved around within the system as needed, for example, as a crop progresses through different growth stages and positioned in different areas of the high-care portion of the facility dependent on their particular needs. Growth trays containing crops with similar requirements may be positioned close to each other for efficiency of the system. Alternatively, some crops may benefit from being interspersed with other types of crops.

Reinforcement rods may be necessary to avoid trays bending in use under the weight of the crop and fluid thereon. Reinforcement rods may be inserted during manufacture and then sealed into the growth tray structure to avoid additional surfaces that could require cleaning. This helps to ensure that the trays maintain their alignment features in the correct position and to ensure that the growth trays are reusable after a crop has been harvested. In this way, waste of growth trays is reduced and the need for replacement growth trays is minimised. In turn this assists in maximising the use of assets in the system.

In another embodiment, a growth tray for storing, germinating, propagating and or growing living organisms, comprising: a body; a growing surface within the body; and at least one inductive coil or wireless power transfer means for receiving power.

The growth tray may further comprise: at least one control interface for receiving control signals from a central control system, and or for transmitting data from one or more sensors.

The growth tray may further comprise: first and second sets of wheels located on opposed sides the body for moving the growth tray along a track, wherein received power and control instructions may activate the first and second sets of wheels to propel the growth tray along the track.

The wheels may comprise: low friction sliders, low friction bearings, or magnetic components.

The growth tray may further comprise: at least one control interface.

In this way, a mobilised growth tray is provided. Rather than moving growth trays around the system manually or using, for example, one or more load handling devices, the growth trays remain on a track for a substantial part of their growth cycle, and may be moved between different zones or areas along the track. As will be appreciated, this arrangement reduces the amount of labour required in managing the growth trays during the life-cycle of the living organisms.

Power and movement of the growth trays may be provided through the inductive coil from a corresponding inductive coil located on or along a track. Each tray may have more than one inductive coil, or a series of inductive coils—for example each serving a different purpose. Two or more tracks may be arranged above one-another to form a rack.

In this way, many trays may be arranged in a racking system to efficiently store, germinate, propagate and grow living organisms to maturity before harvesting. The growth trays may be provided with services and utilities to ensure substantially optimal growing conditions to maximise the crop yield and quality.

The location and movement of growth trays may be controlled by a centralised control system through a control interface on each of the growth trays. For example, a control interface may be positioned on the side of each of the growth trays so that they may be easily accessed to monitor and control each tray.

Further, as each growth tray may be individually traced and tracked within a hydroponic facility, consistency between crops may be improved—for example using identification means such as RFID tags. Still further, sensors may be embedded within the trays making a 'smart' tray. For example, sensors may comprise one or more sensors for detecting the temperature of the air, the relative humidity, the concentration of $CO_2$, the pH, temperature, concentration and or electrical conductivity of the nutrient fluid, one or more cameras, the air flow rate, for the air pressure, fluid volume and flow rate through values etc.

Information or data from the sensors may be relayed to the control system via the control interface. Similarly control instructions from the control system may be received via the control interface. It will be appreciate that the control interface may comprise any suitable means for data transmission. For example, the control interface may comprise a transmitter and receiver, a transceiver, a WiFi interface, an optical wireless communication interface such as a LiFi (light fidelity) wireless interface. In some arrangements, the data exchange may be through a physical channel, however, it will be appreciated that wireless communication may be preferred due to the advantages they provide.

Li-Fi systems are capable of transmitting data at high speeds over visible light, ultraviolet and infrared spectrums. Typically, optical wireless interfaces use light from LEDs. It will be appreciated that Li-Fi does not require a physical connection. Using Li-Fi has the advantage of avoiding potential interference with or from other electromagnetic interfaces. The spectrum of light used for communication may be selected to be outside the spectrum required for growth of the living organisms.

Alternatively, the communication interface may comprise a Wi-Fi interface. It will be appreciated that Wi-Fi does not require a physical connection.

The control system may receive data from the trays or elsewhere within the system, and provide control instructions based on that data.

The growth tray may further comprise: lights located on the lower surface of the body for providing light to another growth tray located adjacent-below.

Of course, it is well-known that many living organisms, such as plants, require light to grow. As will be appreciated, if growth trays are placed on a rack it would be advantageous to provide light over each level of the rack to ensure each growth tray receives optimal levels of light for growth. In use on a rack with several levels, or in a stack, as a result of providing lights on the lower surface of each growth tray, it is possible to provide lighting a growth tray positioned below. The lighting for each growth tray may be controlled by the control system on the basis of the growth tray located below—therefore, positional and identification information of the trays may be provided to the central control system in order to control the lighting system.

Another well-known requirement of living organisms is water and nutrients. The growth tray may further comprise: a fluid inlet, arranged to introduce fluid into a rim, substantially around the perimeter of the inclined growing surface wherein, introduced fluid spreads around the rim and disperses over the growing surface.

In this way, each tray may be provided with fluid comprising a mix of water and nutrients, balanced for the particular crop. The rim helps to ensure that the fluid is distributed substantially evenly over the growth surface so that each individual living organisms may receive the require nutrition. Further, the rim helps to ensure that fluid may be received by the growth surface in a controlled way so as not to disturb the living organisms.

The fluid inlet may comprise a magnet cuff for attracting and locating an attachment, for example a hose. The hose and may be engageable with the fluid inlet. The hose may comprise an interfacing magnetic cuff, and or wherein the hose comprises a spring mechanism. The magnetic cuff may be an electromagnet.

In this way, the control system, via the one or more inductive coils, may control when a hose is attached to the fluid inlet. For example, one or more hoses may be arranged along a track, and the electromagnet may be activated when the growth tray is near to a hose, or when the crop contained on the growth tray requires more fluid. It will be appreciated that different hoses may provide different nutritional blends, as required at different stages during a life cycle. Therefore, each growth tray may receive a specific dose of fluid tailored to the specific instance of the crop, for example, each tray may have individual dose patterns for providing fluid at different times throughout the growth period for the crop in the growth tray and further, may have a specific nutrient mix tailored to the crop type.

Fluid may be introduced to the growing surface from below or from the underside of the growth medium (rather than from above). Fluid may flood the base of the growth tray and saturate the roots and growth medium uniformly. In this way, seeds and seedlings are less likely to be disturbed.

Fluid may be introduced and drained through the same hole in the growth tray. Typically located through the centre of the base of the growth tray.

The growing surface may be inclined in the direction of a drainage system, as noted above in connection with other embodiments.

Another aspect of the invention provides, a light box, wherein the light box is a stackable item, the light box comprises: a frame structure having legs locatable on the perimeter of the growth tray;

and a surface comprising lights on the underside, wherein the light box is arranged to be stacked as a lid to growth tray.

In this way, where growth trays are arranged in a stack or at the top level of a rack, each growth tray may be provided with light.

The light box may be arranged to interface with the drainage system of a growth tray or another stacked item adjacent-above or adjacent-below the light box, and wherein the legs comprise a hollow tube to provide a continuous down-pipe.

In this way, each growth tray in a stack may be provided with light and an integrated drainage system.

The light box may have a lattice structure extending between two or more legs of the frame structure. The lattice structure may be adaptable to match the length of the legs.

In this way, the light box allows air to flow around and over the crop in the stack. Air flow within the system may be maintained, even where stacks of growth trays are positioned close to each other. Further, as a particular crop grows, it may be necessary to increase the height above the growth surface. In these instances, the legs of the light box may be increased in length to provide more space between each level of the stack. The lattice structure may assist in structural support of the stack.

In one embodiment, a modular growth tray system tray for storing, germinating, propagating and or growing living organisms comprising: a growth tray stacked with a light box is provided. The modular growth tray system may have interchangeable legs. The legs may be extendable in length between a first height and a second height.

As discussed above in connection with other embodiments, the structure of the system may be adjusted to accommodate the crop.

According to a further embodiment, a hydroponic system for storing, germinating, propagating and or growing living organisms is provided and may comprise: one or more growth tray(s) or growth tray system(s) for providing at least one service to a crop in a high-care facility. The service provided may be integrated in the one or more growth tray(s) and is one or more of: fluid drainage; lighting; automated movement; fluid delivery; tray reconfiguration; tray or stack rearrangement; or air-flow control.

In the system, the drainage system may further comprise a drain-pipe located adjacent-below the lower-most one or more growth trays and wherein the one or more growth trays drain into the drain-pipe. In the system, fluid collected by the drainage system is recirculated to a filtration, nutrient recovery and or fluid mixing system, for re-use.

In the system, two or more stackable items may be arranged in a stack, or wherein growth trays may be arranged on a rack having tracks. The system may further comprise at least one load handling device for relocating one or more growth trays and or stacks.

The system may further comprise a central control system. The central control system may control one or more of: fluid introduction into one or more growth trays; drainage of run-off fluid; recirculation of fluid; lighting; movement of growth trays; rearrangement of growth trays; hose attachment to a fluid inlet; increasing the height above growth surfaces(s); environmental control; air conditioning; temperature control; and one or more load handling devices.

In the system, the high-care portion is substantially self-contained.

As will be appreciated the self-contained or closed nature of the high-care portion helps to minimise the risks of contamination and other hazards to the living organisms, and helps to reduce the need for regular deep-cleaning of the system.

Another aspect of the invention provides, a method of storing, germinating, propagating and or growing a plurality of living organisms, the method comprising the steps of: providing at least one growing medium prepared with seeds and or seedlings of a living organism; wherein each of the at least one growth medium(s) are placed on one or more growth trays, and providing the living organism(s) with services to enable propagation and or growth.

The method may further comprise: arranging the growth trays in a stack with other stackable items or on a rack. The method may further comprise the steps of: attaching a hose to one or more of the growth trays and controlling the fluid provided to the plurality of living organisms, or attaching a hose to one or more of the growth trays and providing cleaning fluid to at least one growth tray. The method may further comprise the step of: moving a growth tray along a track using inductive loops. The method may further comprise the step of: transferring or relocating the growth tray to a harvest area and harvesting the crop, when the living organisms have grown to maturity.

In at least some embodiments, the crop produced has reduced or substantially negligible Pyrrolizidine Alkaloids, PAs.

This may be substantially due to the level of cleanliness and or control of the high-care environment.

In this way, the present invention addresses some of the problems of the prior art and provides a method and system of increasing the efficiency or yield of a hydroponic growing system. The invention will now be described with reference to the accompanying diagrammatic drawings in which.

Figure 9:
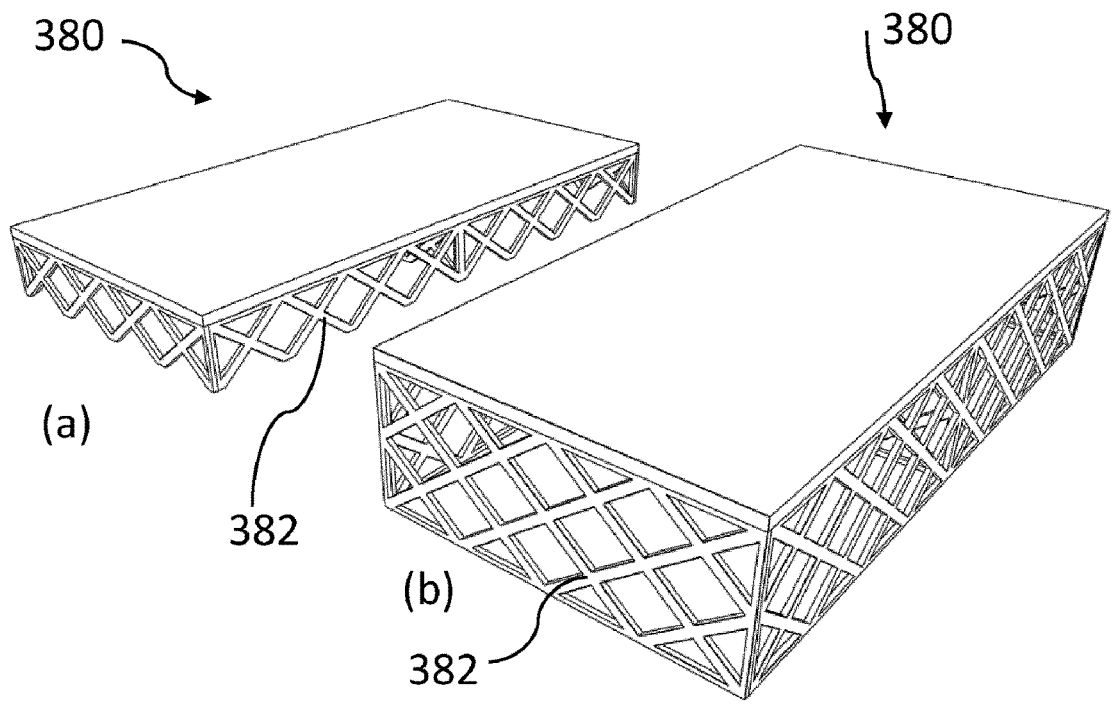
Figure 11:
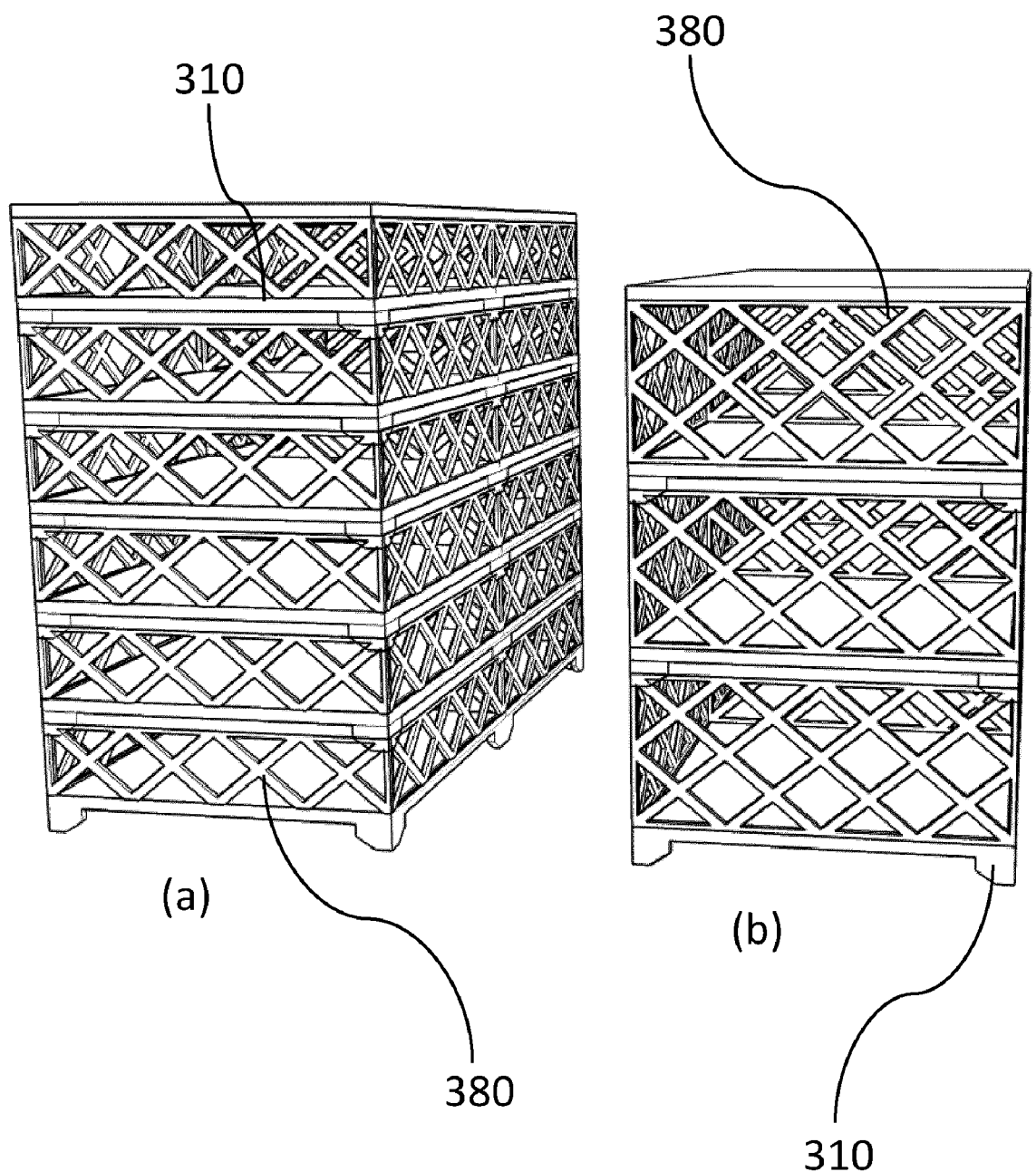
Figure 12:
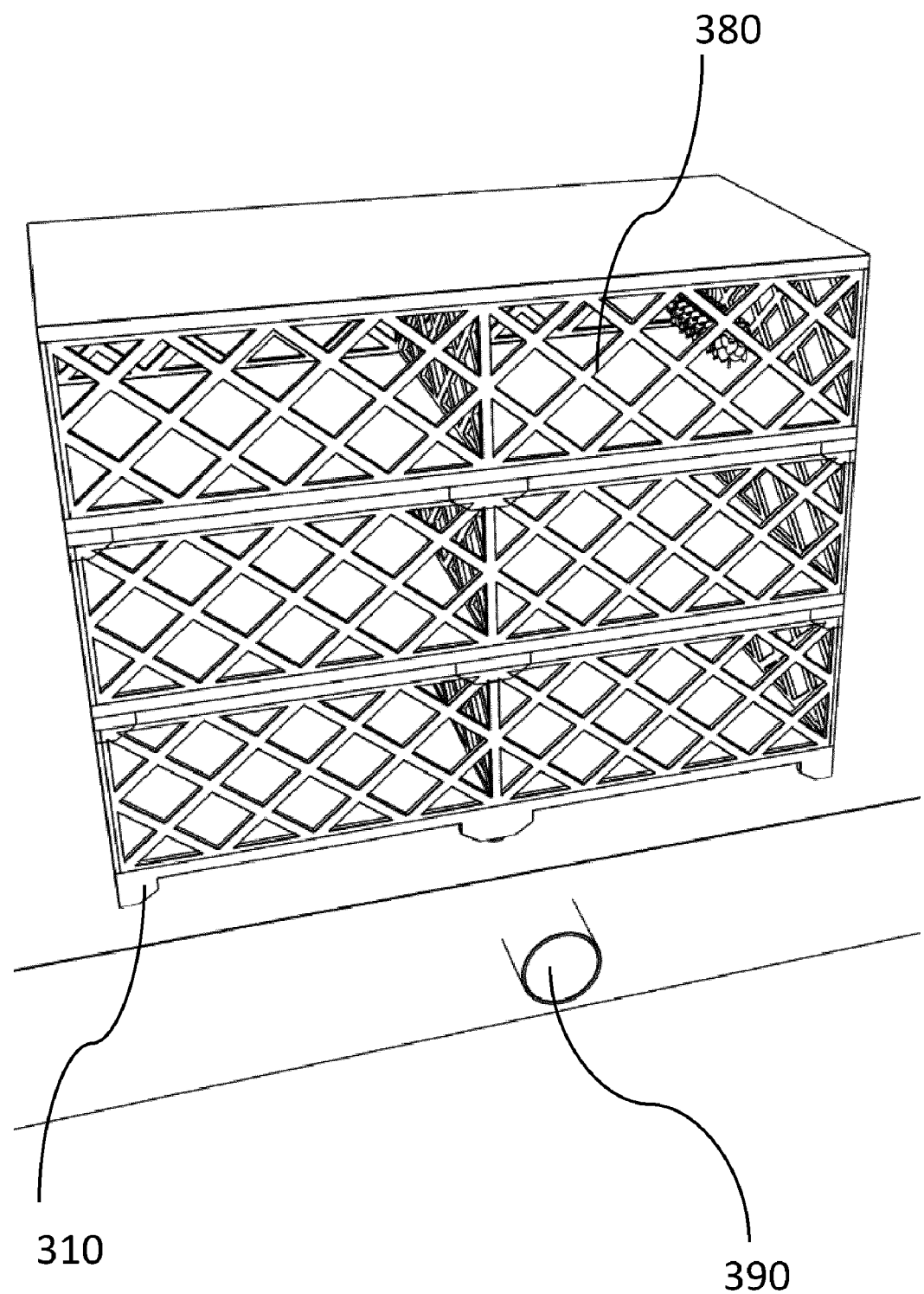
Figure 17:
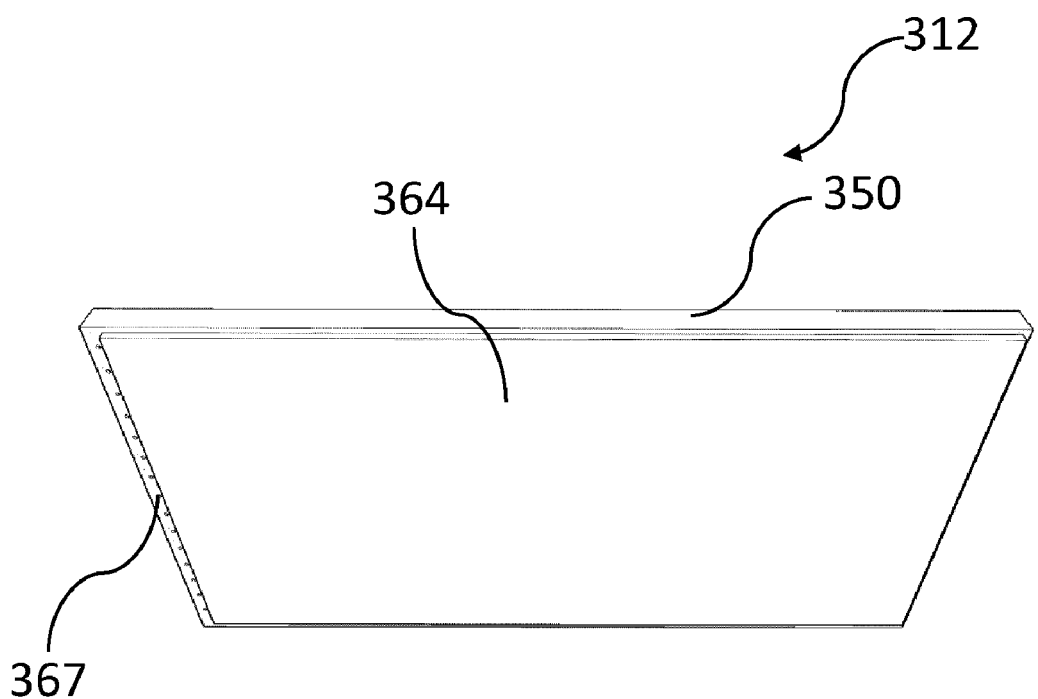
Figure 18:
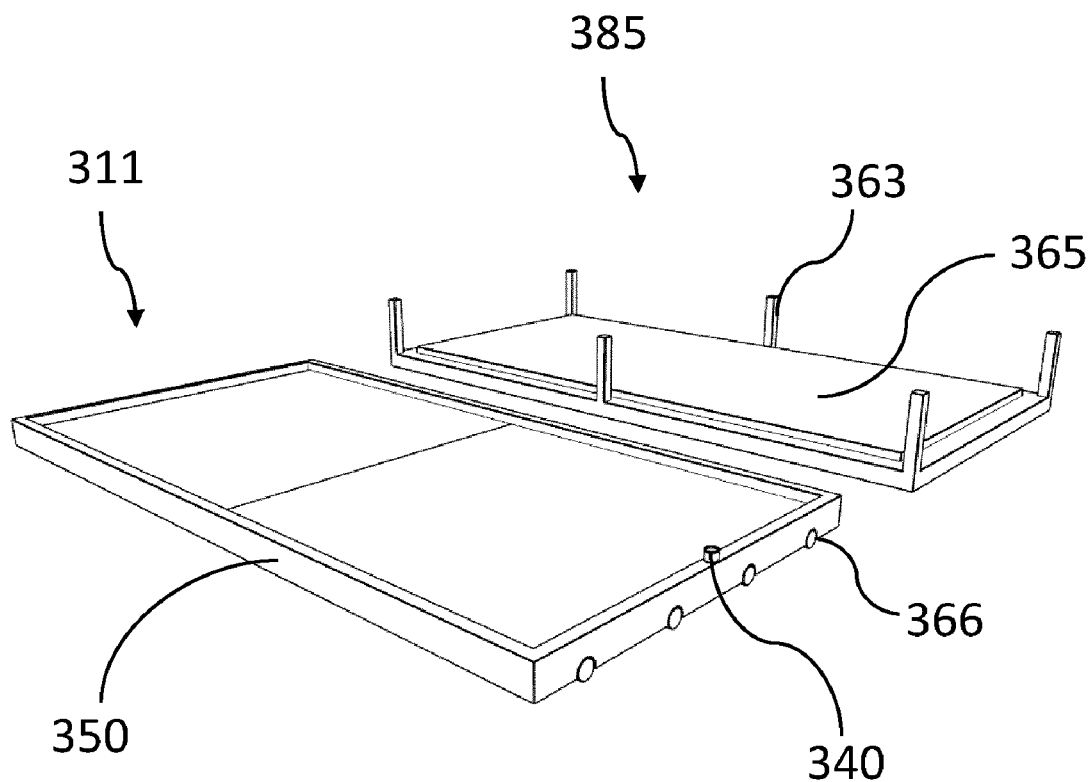
Figure 19:
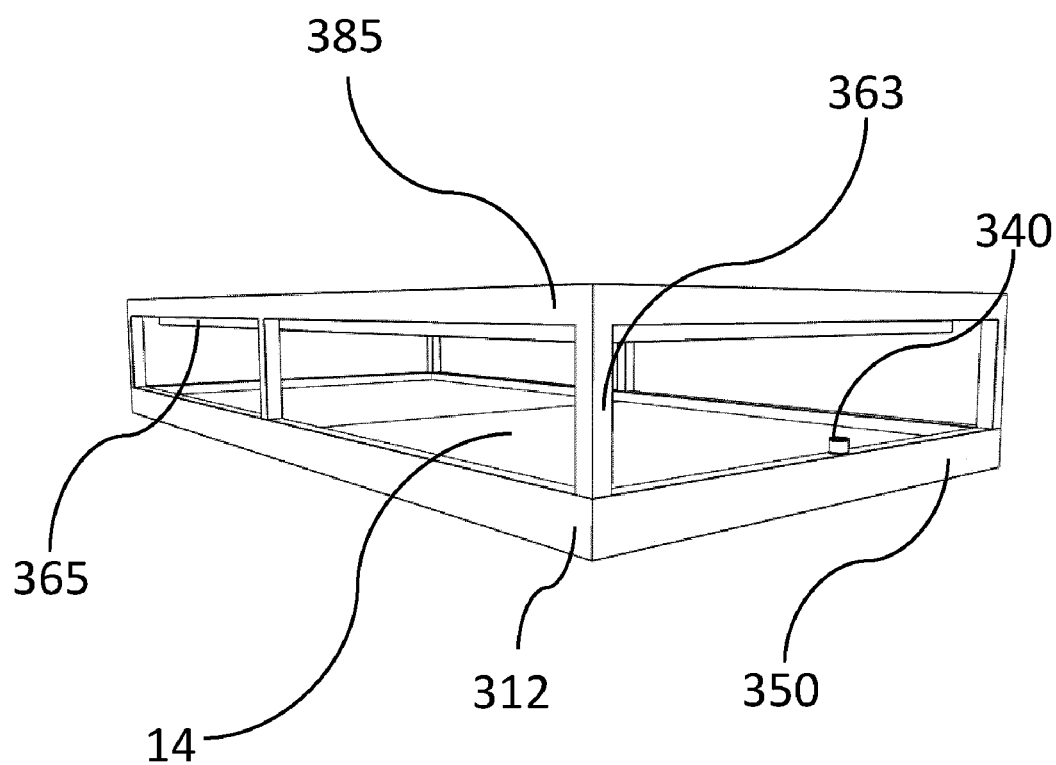
Figure 20:
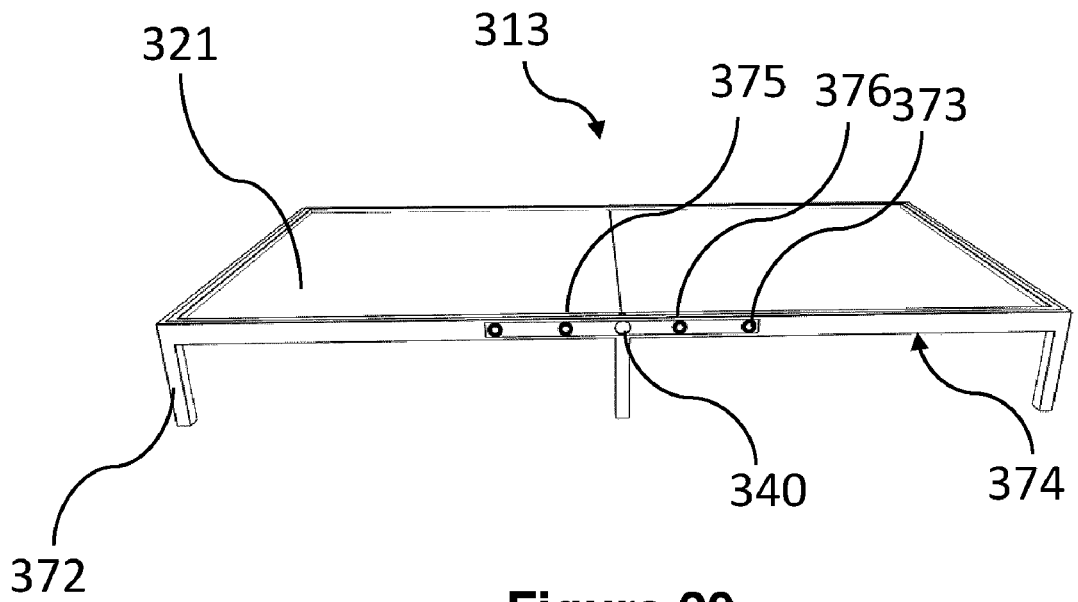
Figure 21:
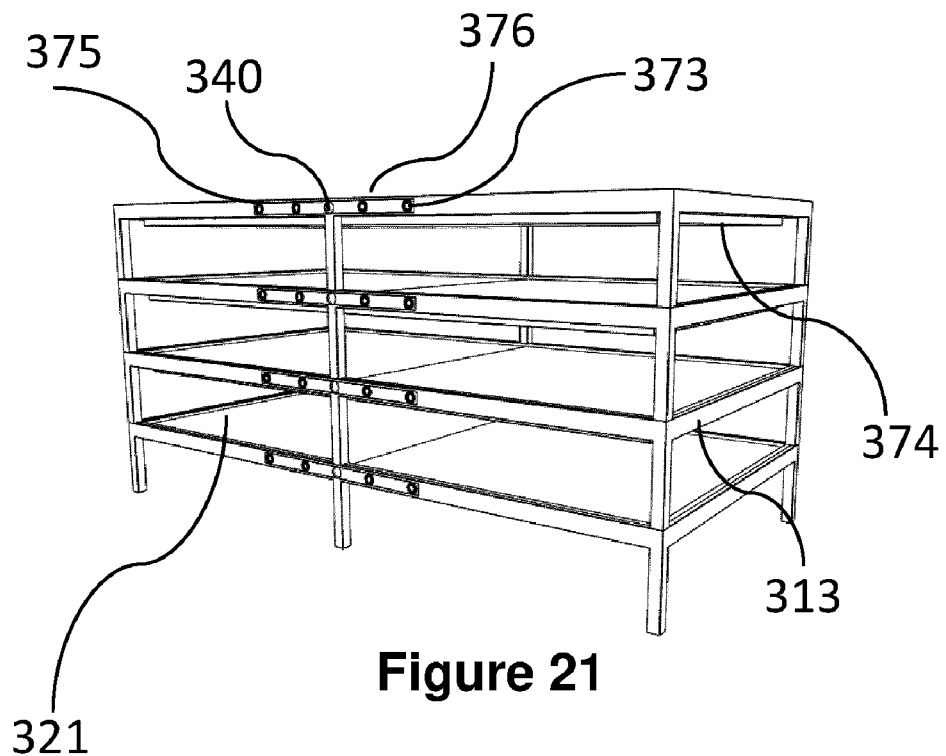
Figure 23:
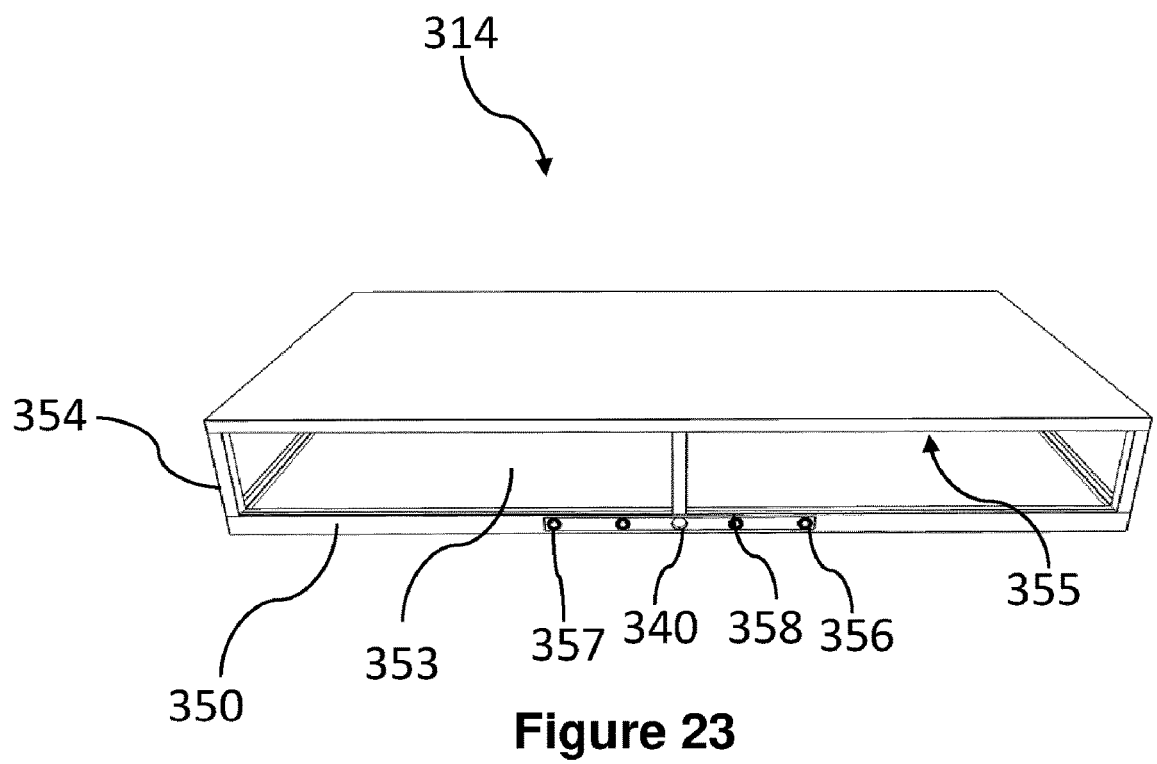
Figure 22:
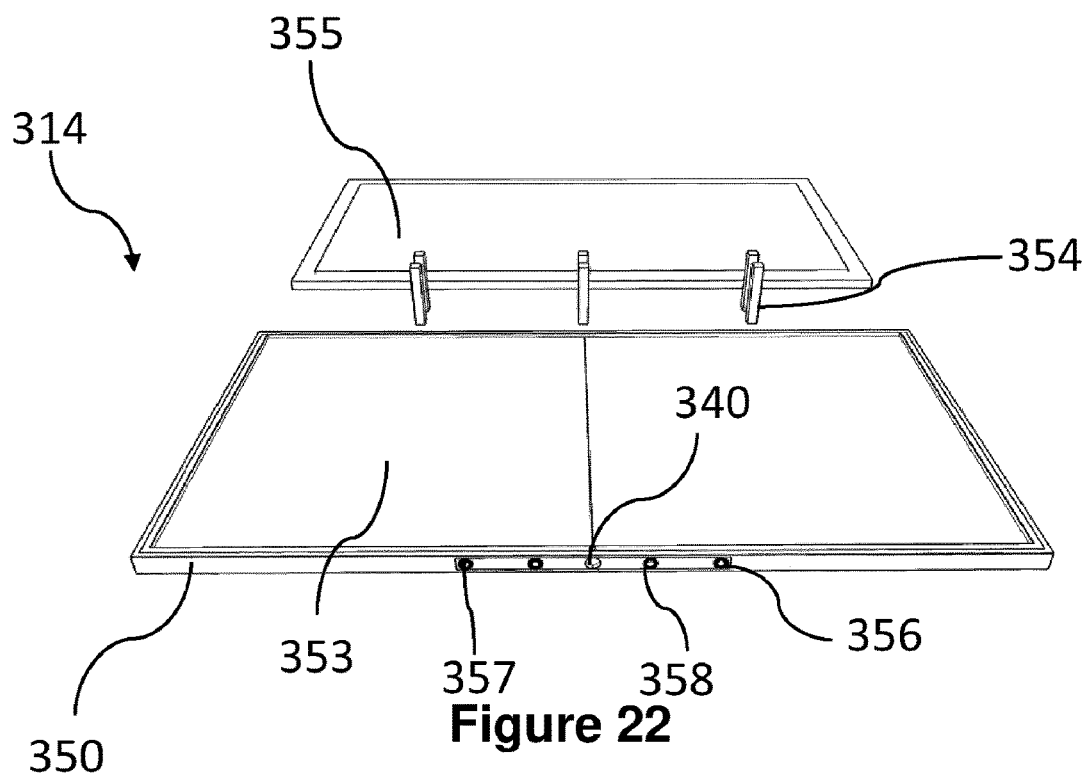
Figure 24:
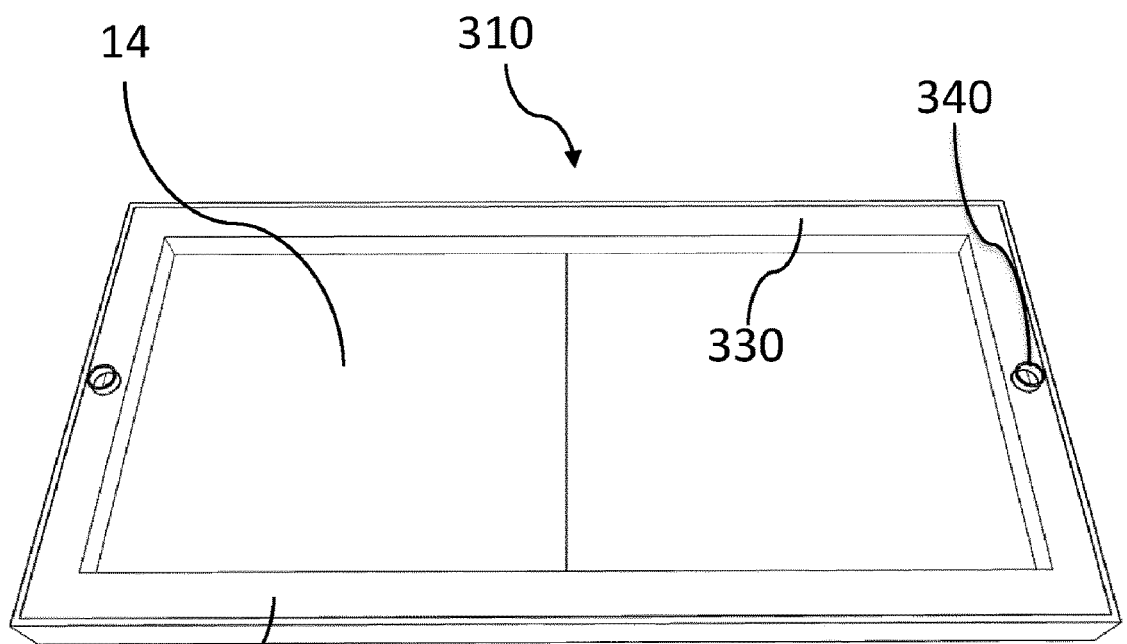
Figure 25:
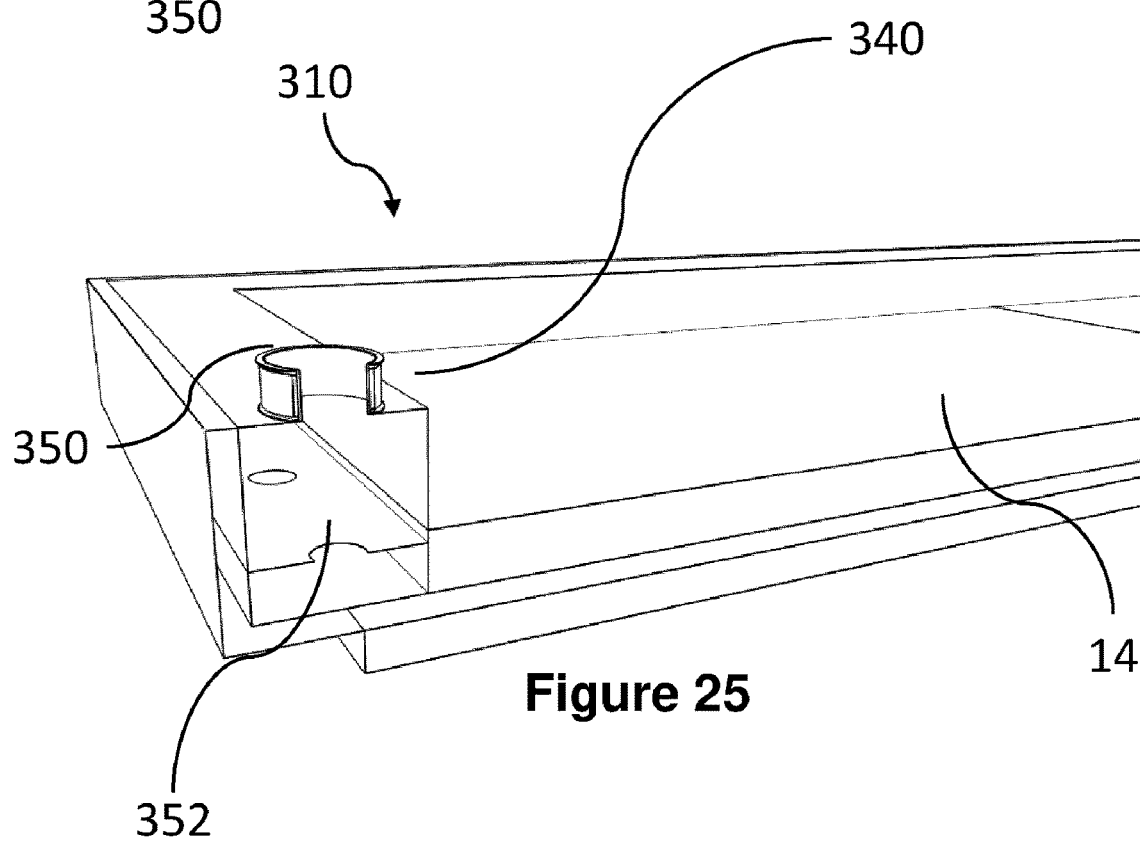

FIGS. 9 (a) and (b), and 10 show a light box or lid for use with a growth tray;

FIGS. 11 (a) and (b) show a stack of growth trays with light boxes;

FIG. 12 shows a stack of growth trays in a hydroponic system having a drain pipe;

FIGS. 13-16 show another type of growth tray having wheels;

FIG. 17 shows another type of growth tray;

FIGS. 18 and 19 show a modular type of growth tray and light box;

FIGS. 20 and 21 show another type of stacking growth tray;

FIGS. 22 and 23 show another type of modular growth tray;

FIGS. 24 and 25 show a detail of the rim of a growth tray; and

Figure 26:
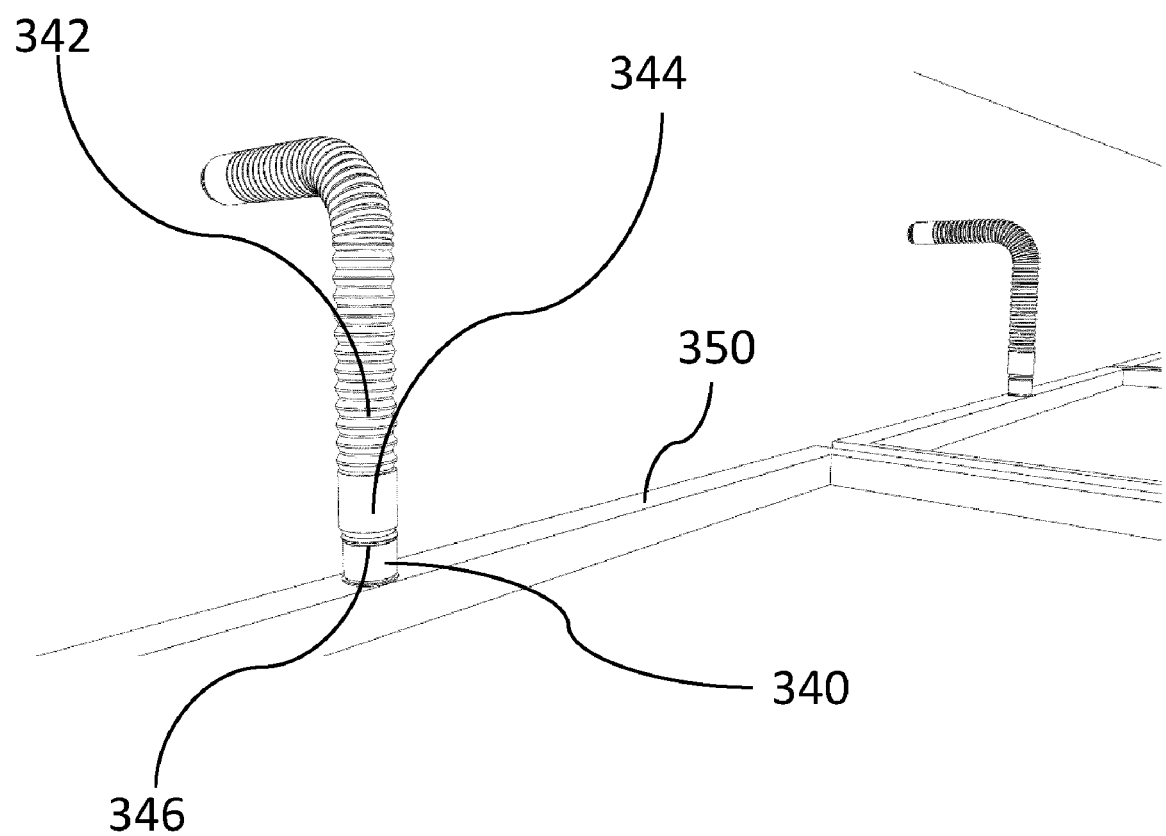
Figure 27B:
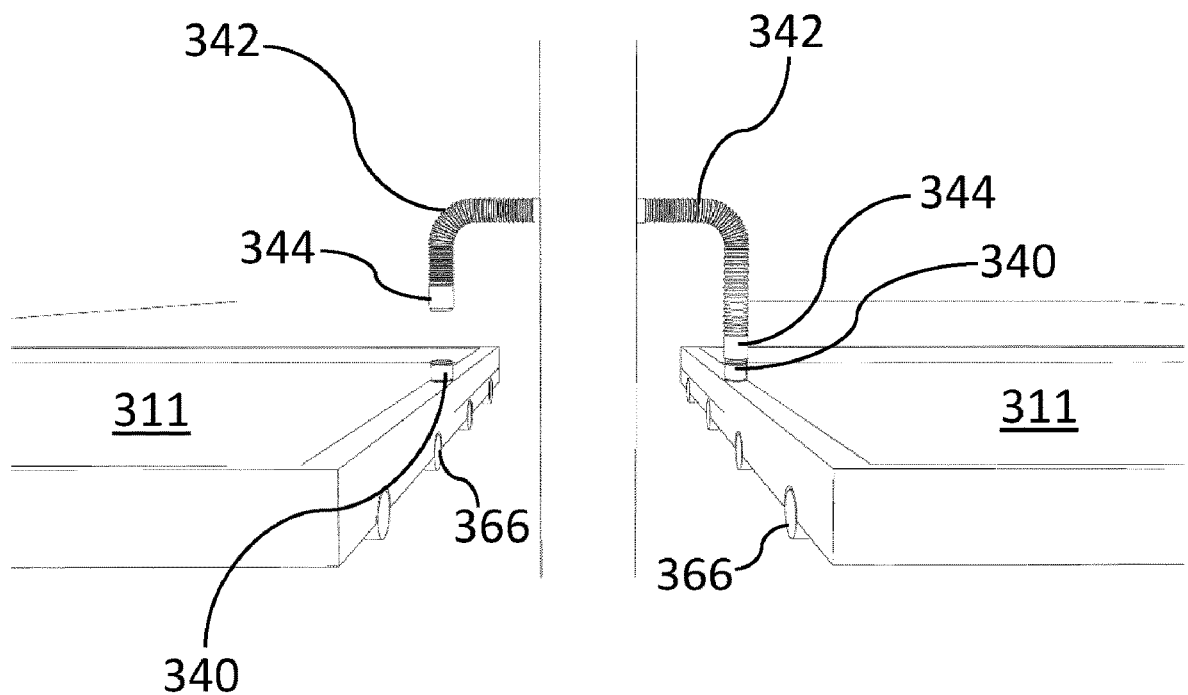
Figure 27A:
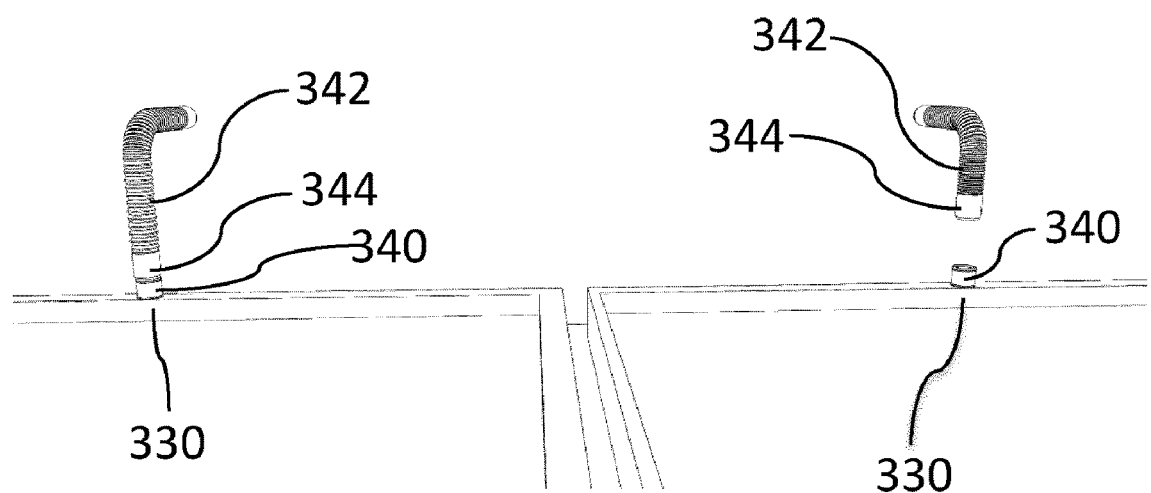

FIGS. 26, 27a and 27b show a hose attachment.

The present invention forms a part of a larger hydroponic growing system. It will be appreciated that the larger system described herein is exemplary only, and other combinations and configurations of the apparatus and equipment described are anticipated by the inventors of the present disclosure without departing from the scope of the invention described herein.

The larger hydroponic growing system 100 comprises a system in which crucial parts of the system 100 comprise a 'high-care' environment. A high-care environment is defined as an area requiring high levels of hygiene, careful and clean working practices, fabrication, and the design of facilities and equipment to minimise product contamination with regard to microbiological hazards. Generally speaking products produced in high-care areas will have undergone a process to reduce any microbiological contamination prior to entering the high-care area.

In hydroponic growing systems, the concept of high-care environments has not been fully utilised. Contamination in the absence of such a high-care environment can lead to reduction in yield of a given crop, infestation requiring sanitisation of a significant volume of the growing chamber or loss of a given crop entirely. Further, crops may have a higher level of PAs.

Figure 1:
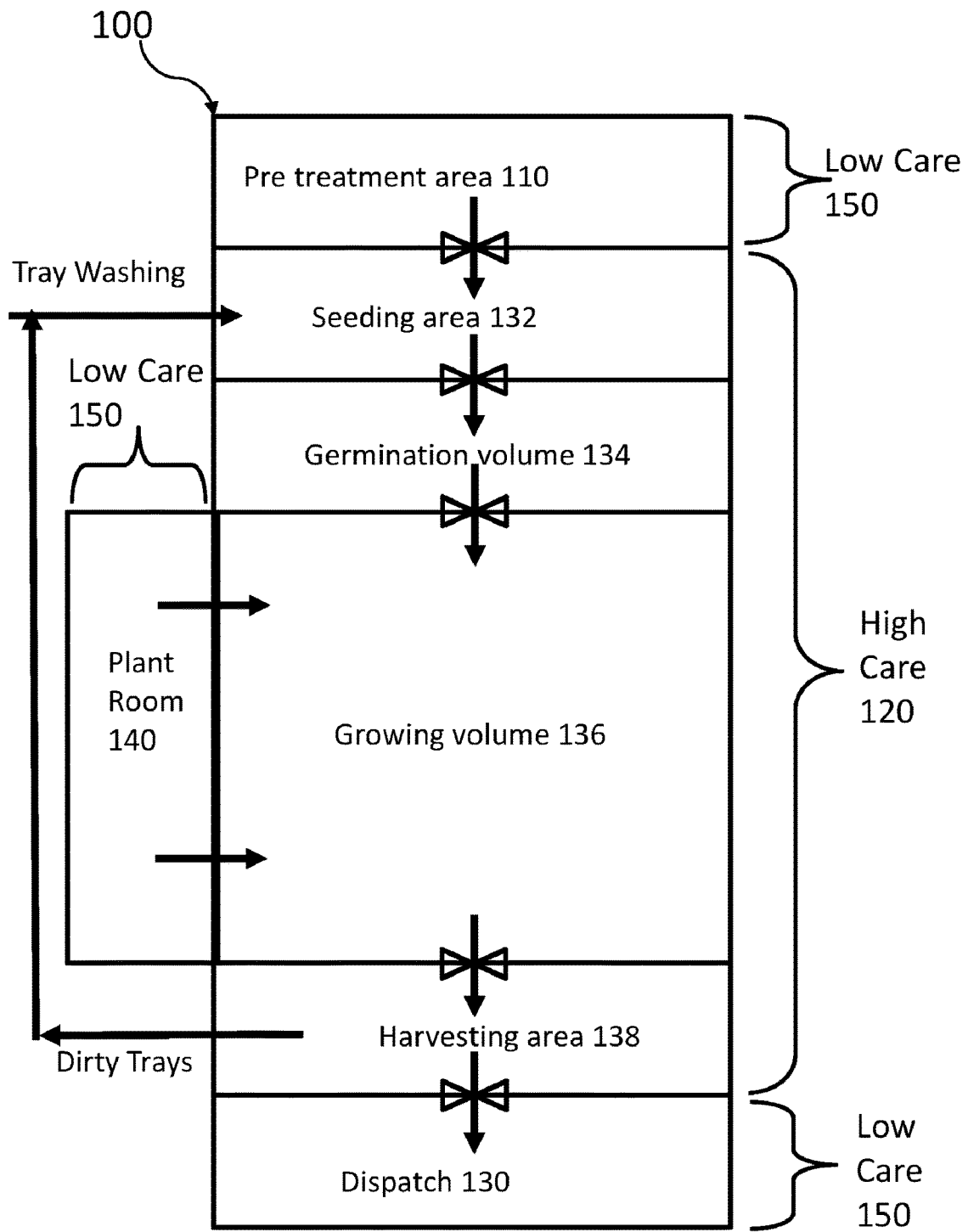
FIG. 1 is a schematic diagram showing an overview of a hydroponic growing system.

As illustrated in the schematic diagram of FIG. 1, the hydroponic growing system 100 may comprise a seed and equipment pre-treatment area 110, a high-care portion 120 and a dispatch portion 130.

The seed and equipment pre-treatment area 110 may comprise hot water treatment means, UVC treatment means and in the case of the seeds, may comprise agitation means. The high-care portion 120 may comprise a seeding area 132, a germination volume 134, a growing volume 136, and a harvesting area 138.

The high-care portion 120 of the hydroponic growing system 100 may comprise equipment designed, treated and installed so as to assist in the maintenance of a high-care environment for seeding, germinating, growing and harvesting crops of any variety.

In order to assist with cleaning equipment located within the high-care portion 120, the equipment is preferably raised off the floor enabling easier and more effective cleaning of the equipment and floor. Further, all uprights of apparatus and where possible as much of the equipment in the high-care portion 120 of the system 100 as possible is painted or treated with antimicrobial paint such as, for example, paint comprising silver. For instance, the walls, floor and ceiling of the high-care portion 120 of the hydroponic growing system 100 are painted white to enable visual checks of the overall cleanliness of the growing system 100.

To assist with preventing contamination by water borne contaminants, preferably the amount and length of drainage system is reduced. Further this may assist with enabling regular deep cleaning of the whole system 100.

It will be appreciated that ethylene may be produced in the germination and growing volumes 134, 136 of the system 100 and this ethylene can stimulate decomposition in fresh or growing produce. Thus, it is vital that where unprocessed produce is held in storage, ethylene is controlled, to ensure that the freshness is preserved and that waste from the process is minimised. Preferably, the high-care portion 120 of the hydroponic growing system 100 may comprise means for removing ethylene. For example, such ethylene removal means may comprise ethylene scrubbers that comprise dry chemical scrubbers. These machines generally have a prefilter, a chemisorption bed and an after filter acting so as to remove ethylene from the environment. However, it will be appreciated that any other form of ethylene removal means may be used.

Further, it is important to maintain air-flow around the living organisms. For example, if the roots of a plant are properly oxygenated then the growing capabilities of the plant may be improved. It also helps to maintain a more stable or constant humidity around the root structure and plant thereby reducing the incidence of fungal or bacterial growth which may become prevalent where humidity is not controlled.

In use, a hydroponic growing system 100 comprising a high-care portion 120 may be used to produce crops with little contamination. Seeds for planting and growing in a high-care environment are pre-treated in such a seed pre-treatment area 110. Such pre-treatment may comprise hot water, and optionally UVC treatment. Additionally, the seeds may be agitated. Once treated, the seeds are bagged and sealed. The pre-treatment area 110 may be a substantially sterile environment.

Further, in the pre-treatment area 110, all growing media is treated with UVC, and equipment for use in the high-care facility is treated with UVC to reduce as far as possible the chances of contamination within the high-care portion 120 of the hydroponic growing system 100. Seeds are also treated with hot water.

A plant room 140 provides plant services to each zone, portion and volume of the hydroponic growing facility. In some instances, it will be appreciated that duplicate service systems are used to separately serve low care and high-care portions 150, 120 to avoid contamination of high-care portions 120 from low care portions 150. Plant services may comprise, control boxes, air handling devices to maintain air humidity and temperature, air compression systems, water treatment and pump facilities, and UVC treatment machines, for example and amongst other things.

Once the seeds, the growing media and trays are all pre-treated they are transferred to the high-care portion 120 of the hydroponic growing system 100.

These pre-treatment steps may be undertaken at a location remote from the high-care portion 120 of the system 100, however, it will be appreciated that such pre-treatment zones may be co-located with the high-care portion 120 of the hydroponic growing system 100.

The high-care portion 120 of the hydroponic growing system 100 comprises a seeding area 132, a germination volume 134, a growing volume 136, and a harvesting area 138.

As required, the cleaned seeds are further treated by, for example, UVC radiation immediately prior to arrangement on growing medium in the seeding area 132, the growing medium being located in the trays. The seeds may be continually vibrated by vibrating means comprising, for example, a vibrating plate whilst UVC treated and whist being arranged on the growing medium. The speed of vibration of the plate may be controllable and the speed used will depend on the particular seeds being processed, the size and variety of the seed and the effect of the vibration with the UVC on the seeds.

Once the equipment and seeds have been pre-treated as required, the seeds are arranged on the growing medium within the trays, and the trays may pass through a transfer hatch located between the seeding area 132 and the germination volume 134. The transfer hatch may comprise means for transferring trays between areas and volumes of the system 100 bounded by walls, for example, in a manner consistent with the maintenance of the high-care environment. It will be understood that a number of transfer hatches may be present in the system 100.

The germination volume 134 may comprise racking on which the trays comprising the seeds are placed for a predetermined time. The predetermined time depends on the seed type, the growth cycle and the yield required for any given crop. It will be appreciated that control of the environment in the germination volume 134 may enable the time taken to germinate seeds to be controlled to a certain extent.

The environment in the germination volume 134 may be controlled. For example, the temperature, humidity, air flow and lighting conditions may be controlled either manually or by a suitable control mechanism. The environment in the germination volume 134 may be sensed by a series of sensors and detectors and the environment controlled according to the environment detected by the sensors or detectors. Such control may be carried out remotely by a suitable control utility.

Once germinated, the seeds are moved to the growing volume 136. For example, the growing trays may be placed on movable racking or may be placed using a pick and place system either robotically or manually. Similarly to the environment of the germination volume 134, the environment of the growing volume 136 may be controlled. The environment in the growing volume 136 may be sensed by a series of sensors and detectors and the environment controlled according to the environment detected by the sensors or detectors. Such control may be carried out remotely by a suitable control utility.

The germinated seeds remain in the growing volume 136 until the crop is deemed ready to harvest. This may be determined visually by operators or may be determined remotely using camera means to view the progress of growth of the crop.

Once deemed ready to harvest, the trays comprising the crops are removed from the growing volume 136 and transferred by any suitable means, robotic or manual, to a harvesting area 138 where the crop is picked, harvested or processed in the appropriate manner for the given crop. Once harvested, the crop may be bagged for onward delivery to direct customers or to commercial retail enterprises.

The dirty trays may be removed from the high-care portion 120 for washing and deep clean before returning to the seeing area 132 to be reseeded with a new crop.

Only once the crop is harvested and bagged will it leave the high-care portion 120 of the hydroponic growing system 100 to the dispatch portion 130.

It will be appreciated that high-care seeding, germinating, harvesting and growing environments reduce contamination during the production of crops in a hydroponic growing system 100.

It will be appreciated that the seeding area 132, the germination volume 134, the growing volume 136 and the harvesting area 138 may be collocated in a single building. However, it will also be appreciated that it is possible to locate the areas and volumes in different locations, however, the high-care environments would need to be controlled in a similar manner across all locations with high-care transfer means implemented between locations.

It will further be appreciated that the seeding area 132, the germination volume, the growing volume and the harvesting area 138 may be located in adjacent rooms of a single building or may be located in a single volume with separately definable volumes as required. In this case, barriers and air locks between the various areas and volumes will be used.

It will be appreciated that the system 100 described above includes many known aspects of high-care treatment. However, it may become possible to apply other treatment regimens or to use other forms of equipment to achieve the result described herein.

Moreover, the system 100 described above may be used to grow a single crop or multiple crops in a single facility. Any crop suitable for growth in a hydroponic growing system 100 may be grown in a high-care portion 120 of such a growing system 100.

Further it will be appreciate that a nutrient rich fluid, provided to the may be recycled for reuse. However, the fluid will require filtering and rebalancing to ensure that it is suitable for re-use. Captured drain fluid, through a drainage system is filtered to remove any larger particles, and passed through UV systems to maintain a given level of cleanliness to the fluid. The cleaned fluid is then dosed to optimum levels of nutrients which is required to be reused by the crop(s).

A larger hydroponic growing system, as described above, is disclosed in UK application GB2577973 (Ocado Innovation Limited), hereby incorporated by reference.

As mentioned hereinabove, growth trays may be placed on a rack. Alternatively growth trays may be placed in another form of stacking system, for example, on a frame or rack as previously disclosed in UK application GB1911505.4 "Hydroponics Growing System and Method". Alternatively, trays may be attached to a "JFC smart pole" as disclosed in co-filed patent application no. GB1918018.1 filed on 9 Dec. 2019 titled STORAGE, GROWING SYSTEMS AND METHODS (Ocado Innovation Limited).

When seeded growth trays or growth trays containing seedlings are placed on a rack lighting and other services or utilities as controlled by a central control means, for example, provision of a fluid nutrient mix, and environmental control for air flow, humidity, temperature and circulation to encourage propagation and or growth of the plants whilst on the rack. As the crop grows, the trays may be rearranged on the rack or the rack may be adapted in order to provide sufficient space for growing.

Thus, the system 100 is able to provide sufficient space and optimised growing conditions for the living organism to grow as it progresses from germination to a mature organism, ready for harvesting.

When the living organisms have grown to maturity the growth tray(s) are transferred to a harvesting area 138, and harvesting the crop. The growth trays may be transferred manually from the stack. Alternatively, a robotic or automated device such as a robotic load handling device suitable for operating with stacked storage systems may be employed to transfer the tray(s).

FIGS. 2-8 show a drainage growth tray 310 according to a first embodiment. The growth tray 310 may be used for storing, germinating, propagating and or growing living organisms. The growth tray 310 comprises two opposed inclined growing surfaces 322 on to which a seeded growth mat 314 may be placed, arrows 323 indicate the direction of the incline. The inclined growing surfaces 322 comprise a plurality of ribs 320 across the width of the growing surface 322 and arranged perpendicularly to the direction of the incline 323. The ribs 320 provide a plurality of channels 324 therebetween, in which fluid may flow in the direction of the incline 323.

Between the inclined surfaces 322 there is a gap in the surface which defines a gutter 325. The gutter 325 is inclined in the direction indicated by arrow 312 towards a drainage hole 326.

Figure 3:
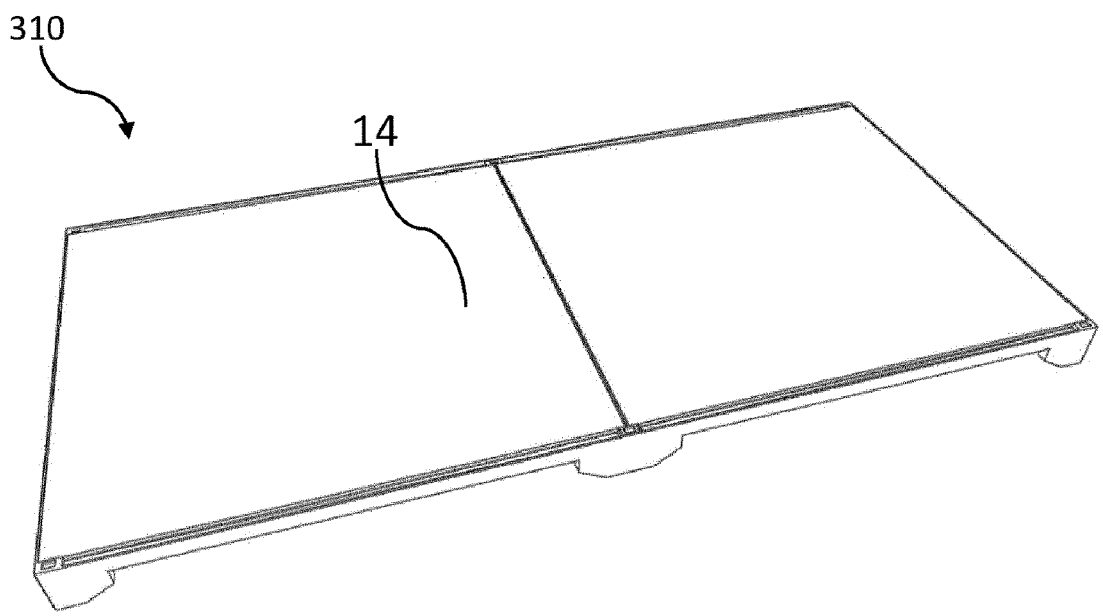
FIG. 3 shows a drainage growth tray of the type shown in FIG. 2 with a growth mat.

FIG. 3 shows the growth tray 310 where growth mats 14 are placed on each of the growing surfaces 322.

Figure 4A:
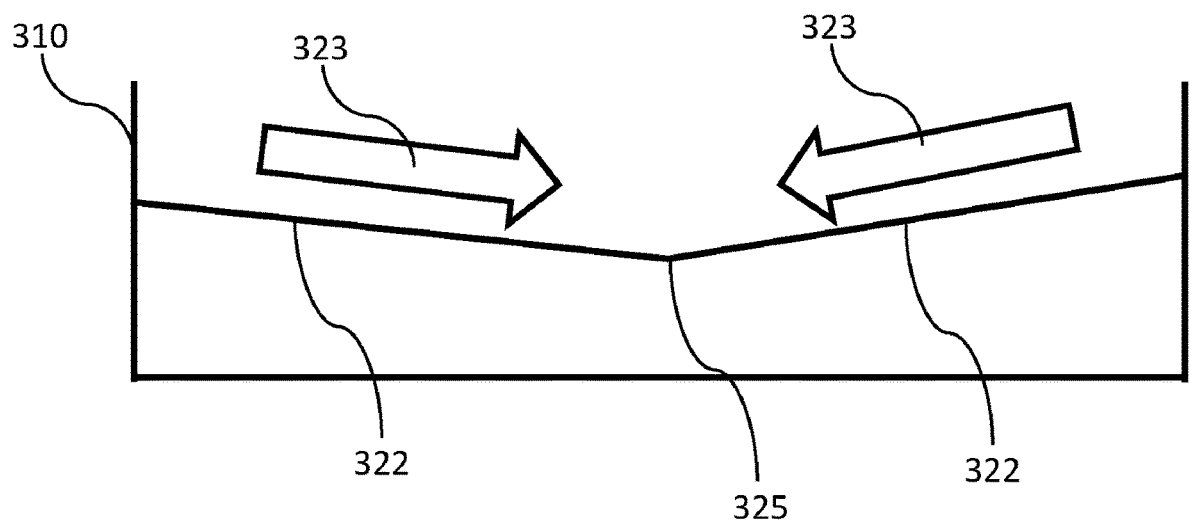
FIGS. 4a and 4b show a schematic diagram showing alternative arrangements of an inclined growing surface.
Figure 4B:
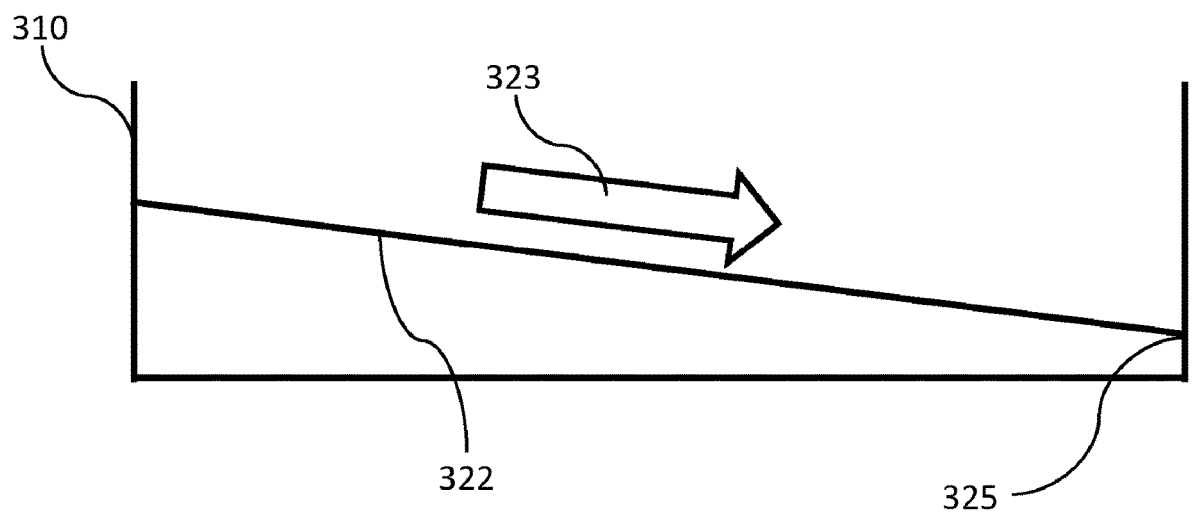

FIG. 4a shows diagrammatically, a simple cross-section of the growth tray 310 where the two opposed growing surfaces 322 are included towards a gutter 325, the arrows 323 indicating the direction of fluid flow. FIG. 4b shows an alternative arrangement of a drainage growth tray comprising a single growing surface 322 inclined to a gutter 325 located along one side of the growth tray, again, arrow 323 indicates the direction of fluid flow.

Figure 5:
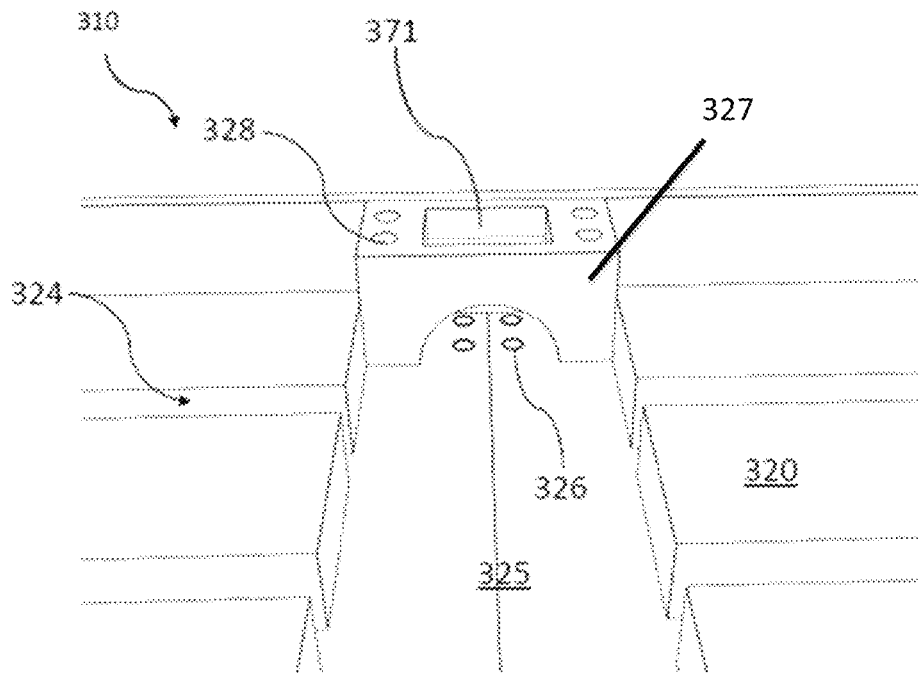
FIG. 5 shows a perspective view of the area around the gutter and drainage holes of a growth tray of the type shown in FIGS. 2 and 3.
Figure 6:
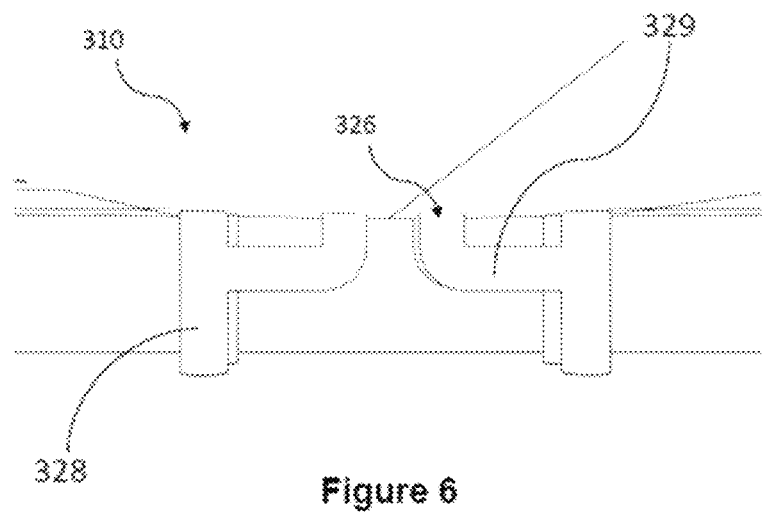
FIG. 6 shows a section view through the drainage structure of a growth tray of the type shown in FIGS. 2, 3 and 5.

FIGS. 5 and 6 show more details of the growth tray 310. FIG. 5 shows a perspective view of the area around the gutter 325 and the drainage holes 326, and FIG. 6 shows a section view through the drainage structure of the growth tray 310.

As shown in FIG. 5, four drainage holes 326 are positioned at one end of the gutter 325. A drainage structure 327 is arranged over the drainage holes 326. The drainage structure 327 straddles the drainage holes 326 with first and second legs each side of the drainage holes 326. The drainage structure 327 is substantially the same height as the sides of the growth tray 310. The upper surface of the drainage structure has a lifting structure 371 and openings of four down-pipes 328 may be seen. As may be seen in FIG. 6, the down-pipes 328 extend straight through the drainage structure 327, through the leg portions of the structure 327. Further, as may be seen in FIG. 6, connecting routing pipes 329 extend from the centre of the drainage structure 327 to the down-pipes 328. Together, the channels 324, gutter 325, drainage holes 326, drainage structure 237 (down-pipes 328, routing pipes 329) provide part of a growth tray drainage system. Thus, fluid propagating through a growth mat 14 resting on the surface 322 may drain into the channels 324, from the channels 324 into the gutter 325 and then through the drainage holes 326.

Figure 2:
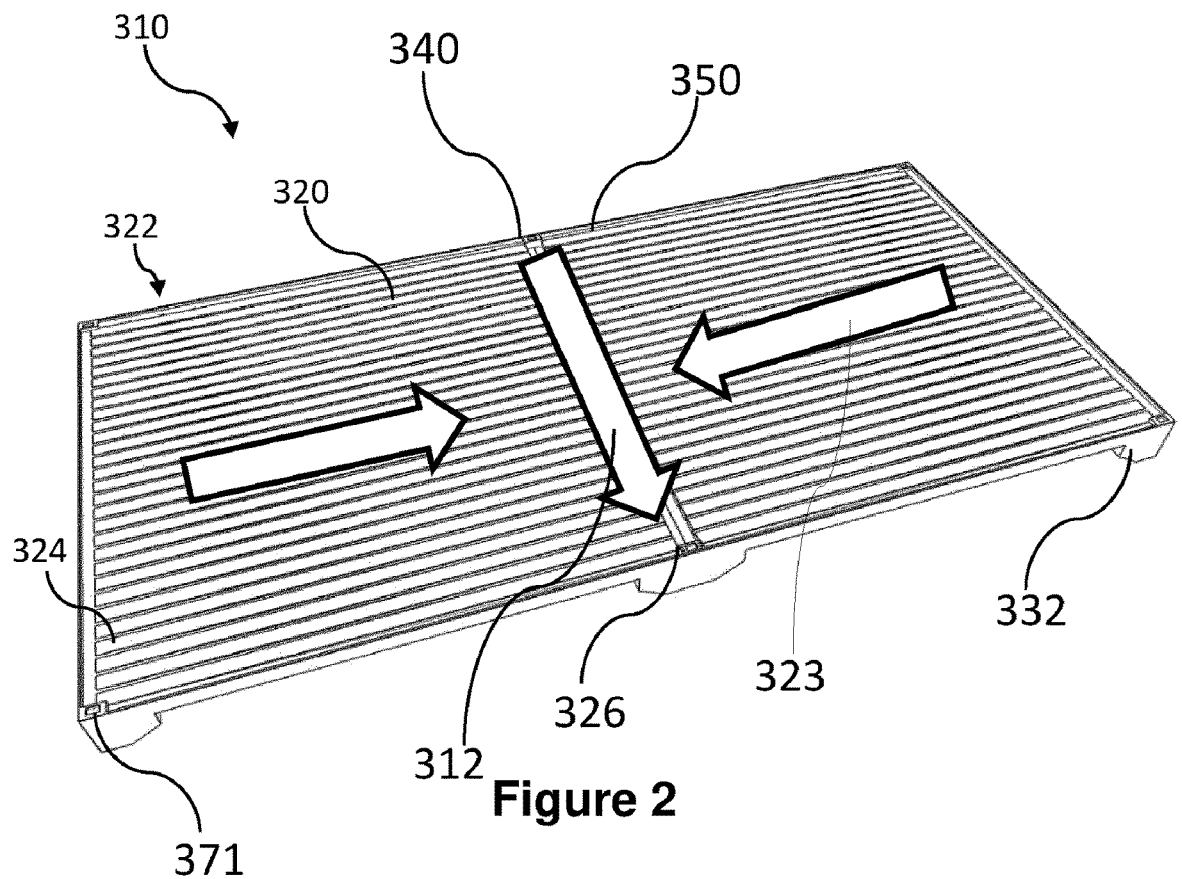
FIG. 2 shows a drainage growth tray according to one embodiment.

The growth tray 310 is provided with a fluid inlet 340. As shown in FIG. 2, the fluid inlet is arranged at one end of the gutter 325. However, the fluid inlet 340 may be arranged in any suitable location for introducing fluid to the tray to propagate over the growing surface 322. It will be appreciated that the drainage system is part of a larger fluid system. Further it will be appreciated that fluid collected from the drainage system may be recycled to be reused within the larger hydroponic growing system.

Figure 7A:
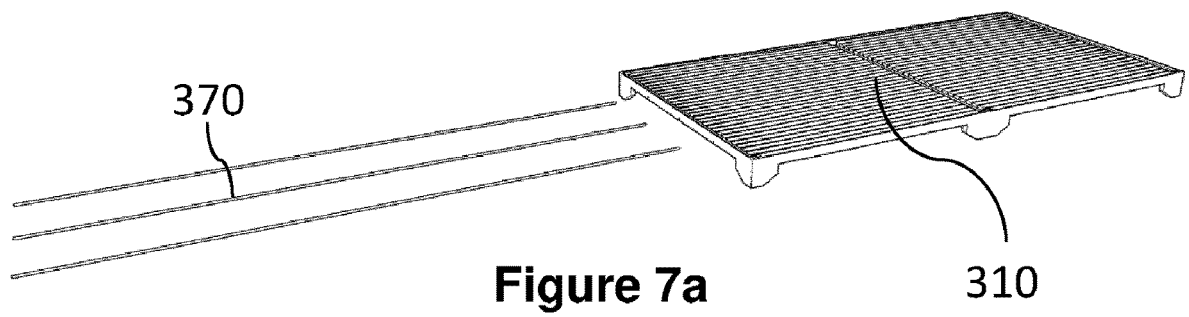
FIGS. 7a and 7b show a growth tray with reinforcement rods.
Figure 7B:
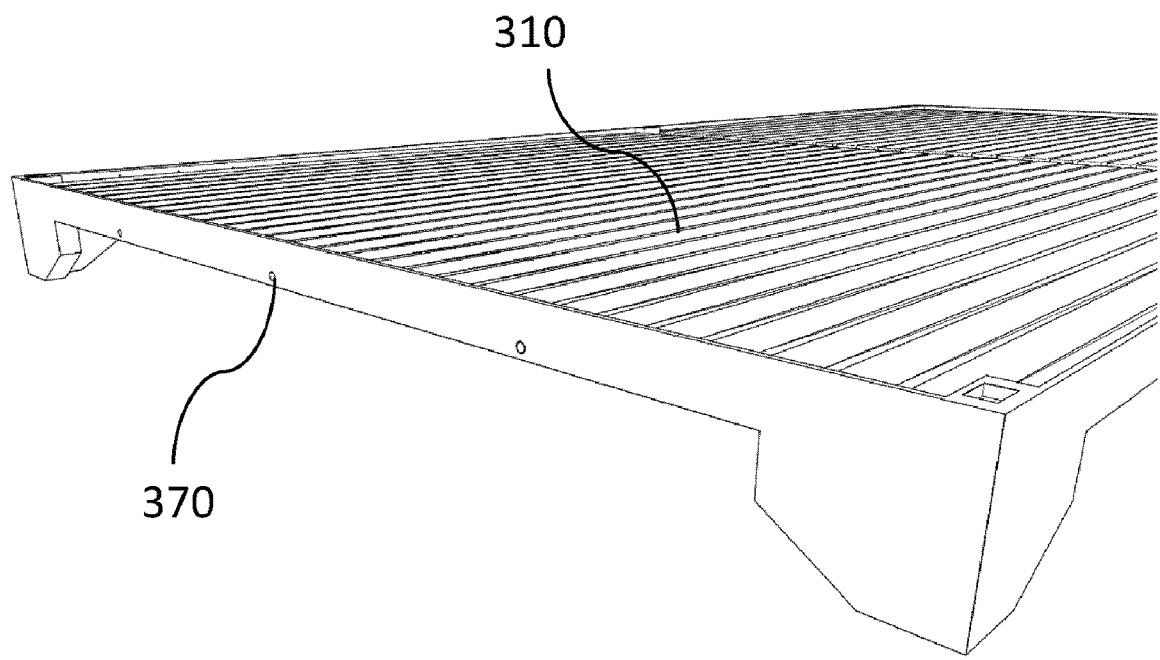

As shown in FIGS. 7a and 7b, larger growth trays 310 may further comprise reinforcement rods 370 to avoid the tray(s) bending under their own weight or when loaded with growth mats 14 and fluid. During manufacture, the reinforcement rods 370 are inserted into the body of the tray(s) 310. The opening is then sealed closed at the incision point to provide a smooth surface and avoid areas where microbiological contaminants might accumulate.

The drainage trays 310 are stackable, and in use, drainage trays 310 may be stacked with other stackable items, such as other growth trays 310 or light boxes as discussed in more detail below. A stack of growth trays 310 is shown in FIG. 8.

When stacked, the down-pipe 328 of an adjacent-above stackable item aligns with the down-pipe of the growth tray 310 adjacent-below. Further, where the adjacent-above stackable item is a second growth tray 310 of the same type, the drainage holes 326 align with the connecting routing pipe 329. Thus, the down-pipe 328 may receive fluid from an adjacent-above stackable item and transmit the fluid to an adjacent-below down-pipe or a drain-pipe located below the stackable item. Further, the routing pipe 329 may receive fluid from an adjacent-above drainage hole 326 and route the fluid to the down-pipe 328.

Growth trays 310 comprise legs 332 for stacking the trays 310. The growth trays 310 each comprise a leg 332 at each corner, and may further comprise an additional leg 332 at the centre of the tray 310. The legs 332 comprise load bearing supports for the tray 310. At least one of the legs 332 may be coincident with the drainage structure 327. Thus, drain fluid may flow from the top of the stack to the bottom of the stack through down-pipes 328.

Figure 8:
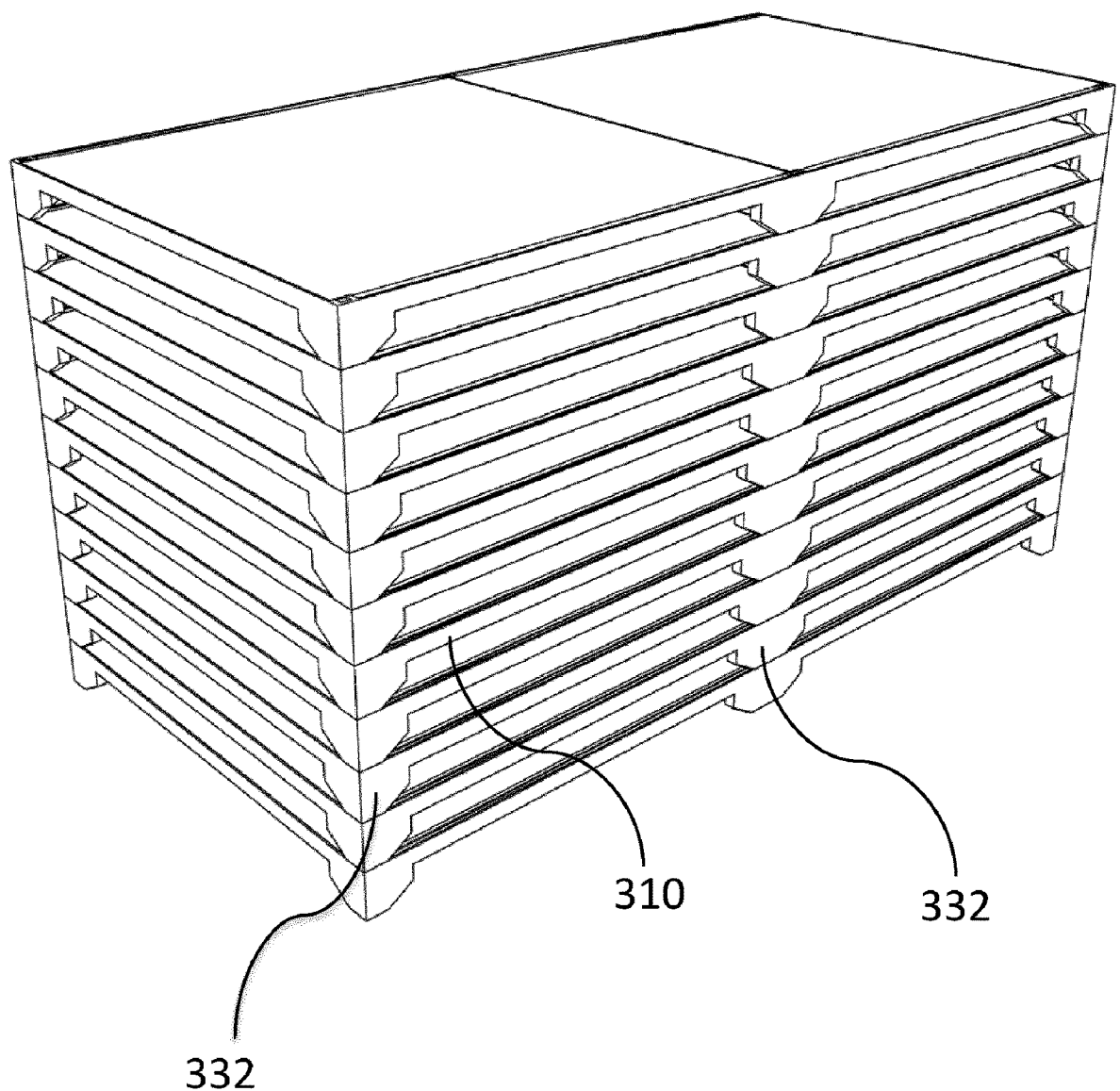
FIG. 8 shows a stack of trays of the type shown in FIGS. 2, 3 and 5.

The stacked arrangement shown in FIG. 8 may be used for storage or during the germination stage of the life cycle of the living organism.

Figure 10:
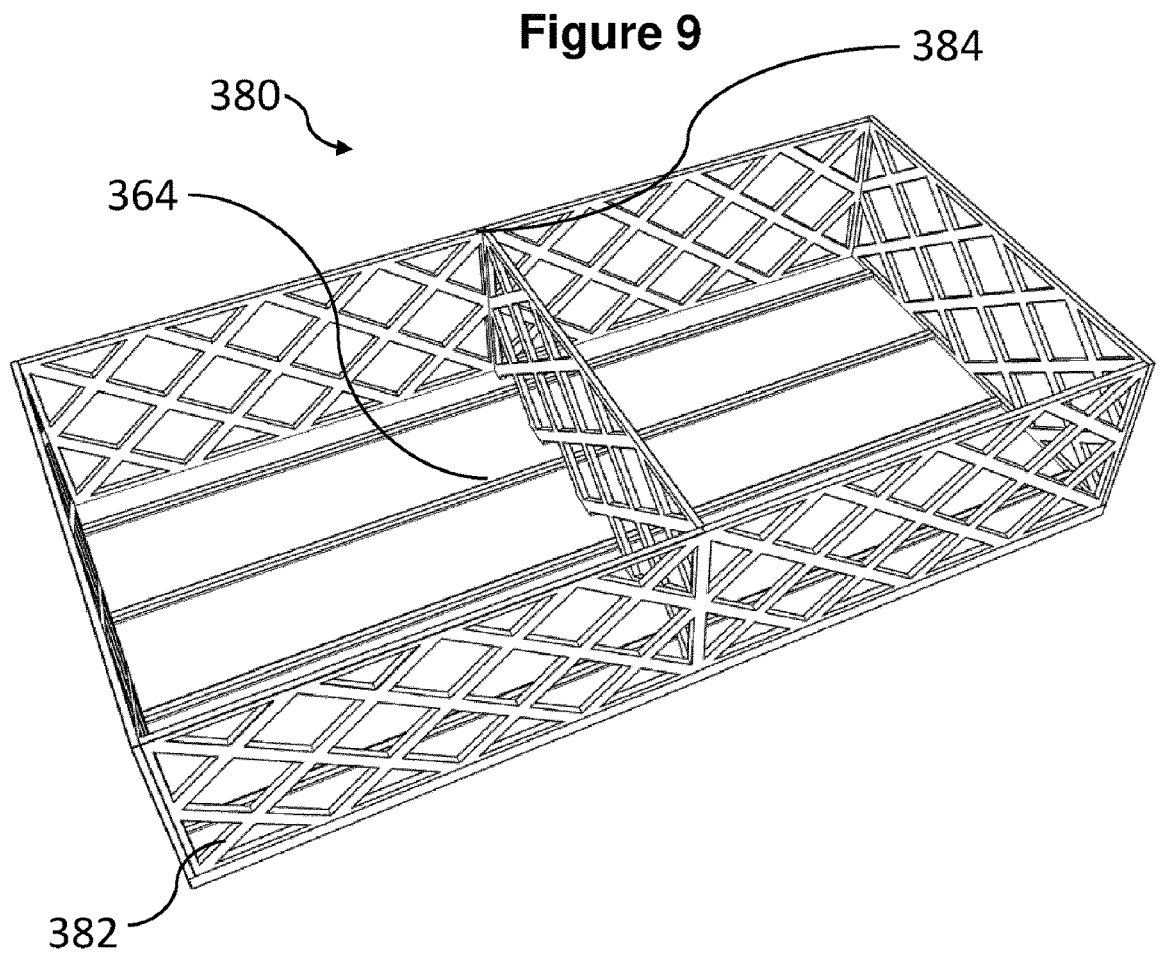

Once germinated the seedlings will require light in order to continue to grow. FIGS. 9 (a) and (b) and 10 show a light box or lid 380 that may be stacked with the tray(s) 310 in order to provide light above the growing surface(s) 322. FIGS. 9 (a) and (b) show a perspective view of the upper side of the light box 380 and FIG. 10 shows a perspective view of the lower side of the light box 380. The light box 380 is substantially the same size as a compatible growth tray 310. The light box 380 comprises a frame structure 382 having legs 384 located around the perimeter of the light box 380. The frame structure 382 has an open lattice structure to allow air to flow freely through the light box. This allows a stable and controlled environment to be maintained around the crop. The provision of the open lattice structure assists in preventing an unfavourable micro-climate to build-up around the crop. For example, if a more closed system were used then additional control systems could be required in order to maintain a stable and optimised environment.

The frame structure 382 may have a fixed height. As shown in FIG. 9 (a), the fixed height is for smaller or younger crops, and as shown in FIG. 9 (b) the height is taller to allow space for larger or more mature crops.

As shown in FIG. 10, the underside of the upper surface comprises lights 364 extending across the area of the light box 380. Further, an optional additional lattice structure is provided across the centre of the light box 380 to provide additional support. At the centre of one side of the light box 380, there is provided down-pipes 384 located to correspond with the down-pipes 328 of the trays 310 and allow drainage to go straight through the light box 380.

As shown in FIGS. 11 (a) and (b), growth trays 310 may be stacked alternatively with light boxes 380 to create a stack suitable for growing the crop after germination. When the crop is small, light boxes 380 with a smaller height are used in order to stack layers of growth trays 310 more closely as shown in FIG. 11 (a). When the crop becomes taller, the light boxes 380 may be exchanged for light boxes 380 having taller sides. The most appropriate light boxes 380 may be selected to make most efficient use of the space available. In an alternative arrangement, it is possible to change the height of light boxes 380 as the crop grows by expanding the lattice structure and there by negating the need to exchange light boxes 380 for one of the most the appropriate size during life cycle of the crop.

As will be appreciated, advantageously in a stack of growth trays 310 and light boxes 380, once fluid drains through the drain hole 326 into the down-pipe 328 the fluid will be in a substantially closed or self-contained part of the drainage system. Therefore, the opportunity for contamination from microbiological and other hazards as the fluids are recycled is minimised.

As mentioned hereinabove, the drainage structure 327 comprises a lifting structure 371. Lifting structures 371 may also be located at leach corner of the tray(s) 310. The lifting structure(s) 371 are arranged to be manually or robotically compatible. For example, a tray 310, a light box 380 or stack may be lifted and transferred to another part of the system by a robotic load handling device.

Thus far we have been considering trays which are suitable for stacking in a free standing stack to be arranged directly on the floor within the germination volume 134 or growing volume 136, within the high-care portion 120 of a growing system 100. This arrangement has the advantage of reducing the resources to set up the system. Further, the free standing stacks negates the need for racks. Of course, in an alternative arrangement of the system it will be appreciated that the trays 310 and light boxes 380 may be placed on a rack.

As shown in FIG. 12, a stack of growth trays 310 and light boxes 380 play be placed in the growing volume of a larger hydroponic system 100 directly above a drain pipe 390. The stack may drain from the down-pipe(s) 328 of the lower-most growth tray 310 directly into the drain pipe 390 through a hole in the floor. In alternative arrangements, the stack may be provided with a conduit linking the down-pipe(s) 328 of the lower-most growth tray 310 to the drain pipe 390. From the drain pipe 390 the recovered fluid may be circulated to be remixed and recirculated to the crops.

Figure 13:
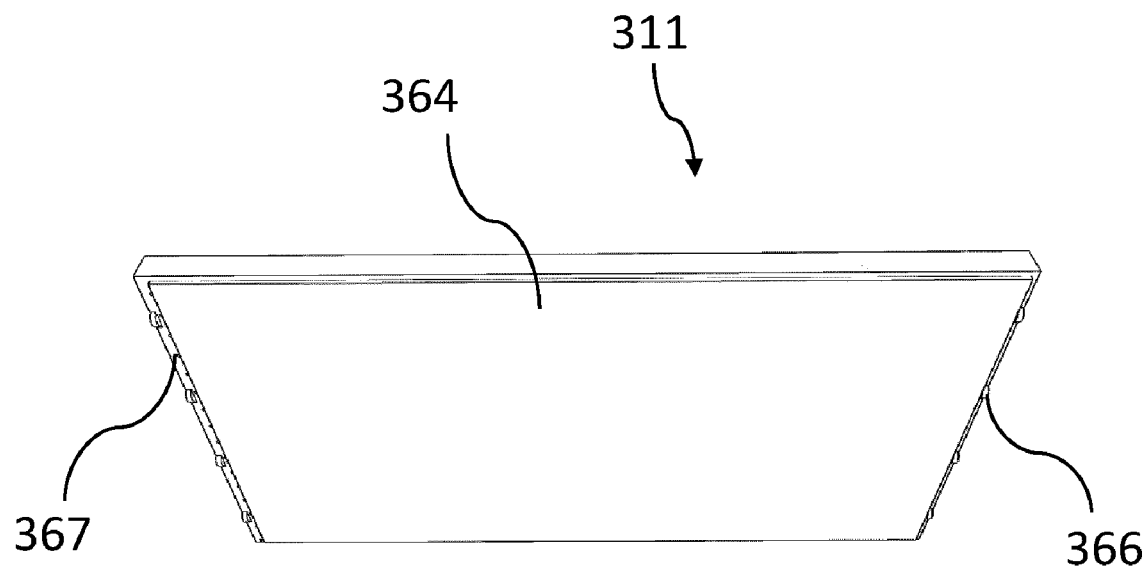
Figure 14:
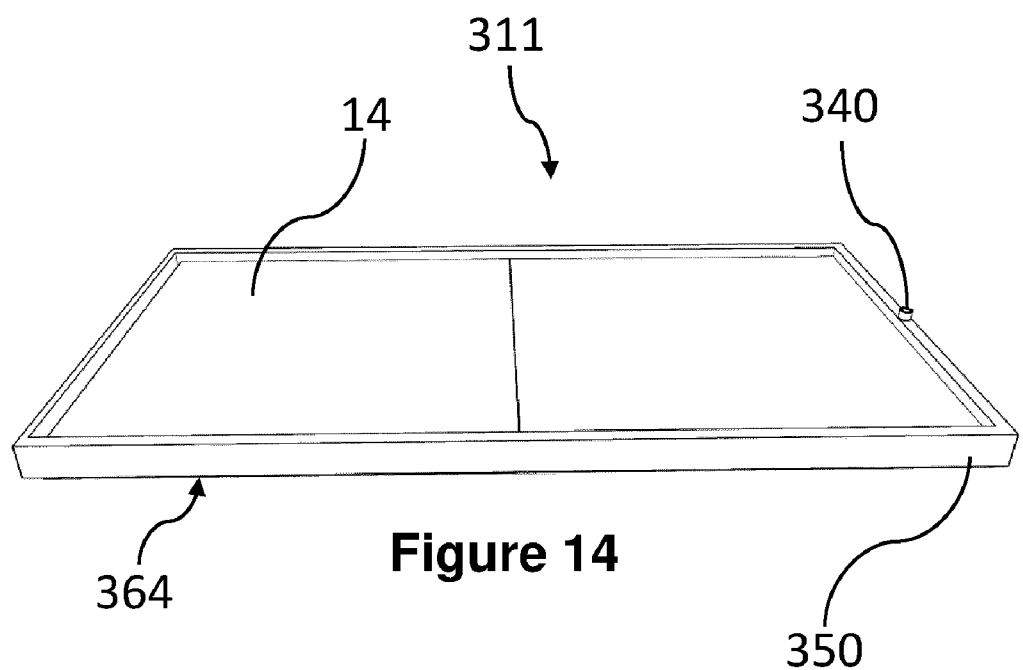
Figure 15:
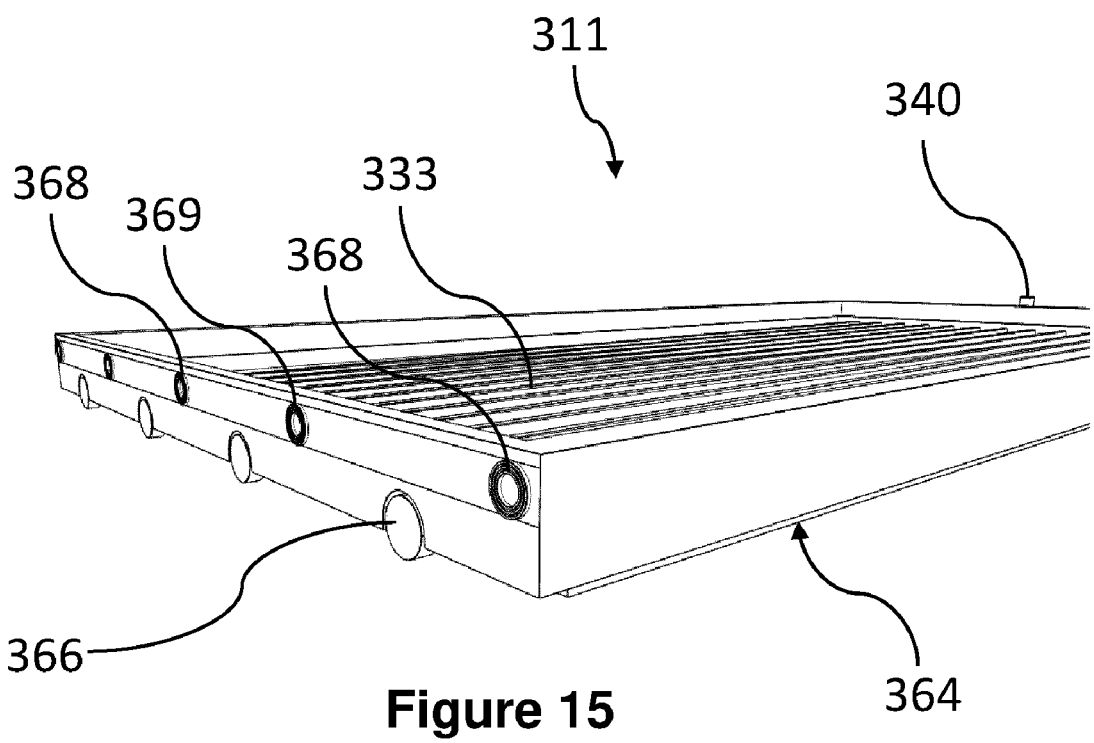
Figure 16:
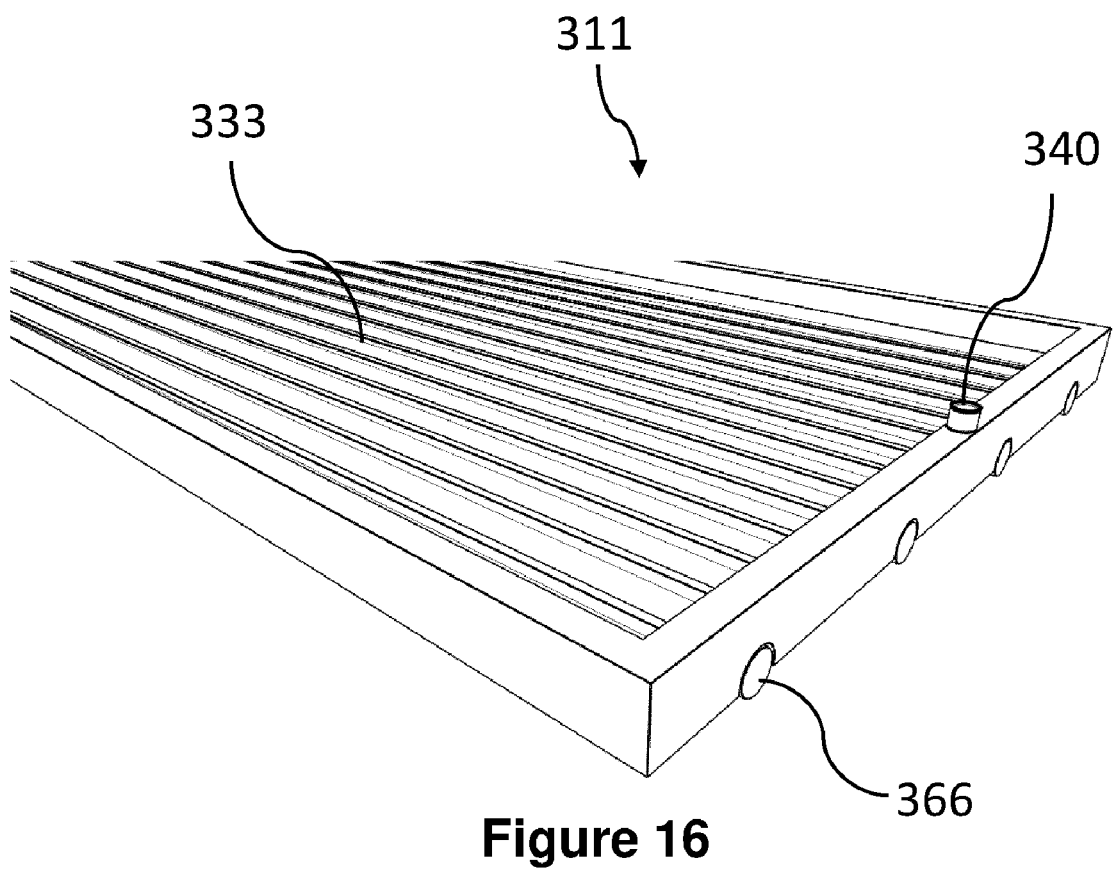

Referring now to FIGS. 13-16, a wheeled growth tray 311 suitable for using on a rack will be discussed. FIG. 13 shows the underside of the growth tray 311, and FIG. 14 shows the upper surface of the growth tray 311. FIGS. 15 and 16 show the arrangement in more detail.

Opposed sides of the growth tray 311 each have four wheels 366. As will be appreciated, the number of wheels on each side could be greater or less than four. The wheels 366 are arranged along opposed sides of the growth tray 311 to engage with parallel rails or tracks on a rack. The wheels 366 may be passive, allowing the tray 311 to be pushed along the rack, or the wheels 366 may be automated so that the tray 311 may move along the track.

Along one edge of the growth tray 311 there are a plurality of drainage holes 367 which extend through the growth tray 311 for draining fluid from the upper surface. Further, extending across substantially the entire underside of the growth tray 311 are lights 364. When the growth trays 311 placed on a track having multiple levels, the lights 364 of an adjacent-above growth tray 311 will illuminate another growth tray on the rack level below.

The upper surface of the growth tray 311 is suitable for receiving one or more growth mats, as shown in FIG. 14. Around the perimeter of the growth tray 311, a rim 350 is shown, and positioned on one side of the rim 350 is a fluid inlet 340. Fluid is introduced to the growth tray 311 via the fluid inlet 340 and will be discussed in more detail below.

As may be seen in FIGS. 15 and 16, the wheels 366 are set into the body of the growth tray 311. Above the wheels 366, a row of inductive coils 368 is provided interspersed with a communication interface 369, again set into the body of the growth tray 311. The inductive coils 368 may be used to provide power to the growth tray 311, for example for powering the lights 364, wheels 366 and fluid inlet 340. The tray 311 may also be provided with a number of sensors and controls. The sensors and or controls may be embedded within the body of the tray. The communication interface 369 may comprise any suitable means, such as a WiFi or LiFi interface, and used to transfer data collected by the sensors, and receive control signals. An inductive power source may be built into the rack on which the tray(s) 311 rest to provide power to the growth tray(s) 311. The power supply provided to and services provided by the growth tray(s) 311 may be controlled by a central control system. The central control system may control where the growth tray(s) 311 are located along the rack, movement of the growth tray(s) 311 along the rack and the growing environment for the crop.

As shown in FIGS. 14-16, the fluid inlet 340 is located on the side opposed to the inductive coils. The growing surface 333 is inclined and comprises a plurality of ribs and channels similar to those of growth tray 310, and has a flow direction towards the drainage holes 367.

FIG. 17 shows an alternative growth tray 312. The growth tray 312 is similar to the growth tray 311, having a plurality of drainage holes 367 which extend through the growth tray 312 for draining fluid from the upper surface. Again, similarly to growth tray 311, extending across substantially the entire underside of the growth tray 312 are lights 364. When the growth trays 312 placed on a track having multiple levels, the lights 364 of an adjacent-above growth tray 312 will illuminate another growth tray on the rack level below. However, growth tray 312 does not include wheels and instead is intended to be placed on a track and remain static until moved or rearranged manually or by a load handling device.

FIG. 18 shows a modular arrangement of a growth tray 311 and a light box 385. It will be understood that the light box 385 could be used together with another type of growth tray 310, 312 such as those discussed herein.

The light box 385 comprises lights 365 extending across substantially the entire underside of the light box 385. Further the light box 385 comprises support legs 363 at each corner, and optionally additional legs 363 (as shown) positioned substantially at the mid-point of the longer side.

FIG. 19 shows the light box 385 arranged with a growth tray 312, as described above. The light box 385 is substantially the same size as the growth tray 312, and the legs 363 of the light box 385 are located on the rim 350 of the growth tray 312.

FIGS. 20 and 21 show another growth tray 313 arrangement. The growth tray 313 comprises a growing surface 321 and a number of support legs 372 arranged at the corners and mid-point of the growth tray 313. The underside of the growing surface 312 comprises lights 374 extending substantially across the entire surface and for providing illumination to a growth tray below. The growth tray 313 further comprises a fluid inlet 340 arranged on the side and mid-point of the perimeter of the growth tray 313. Either side of the fluid inlet 340 are a number of inductive coils 375, a communication interface 376 and sensors 373. As shown in FIG. 21, the growth trays 313 may be stacked.

An alternative arrangement of a growth tray arrangement is shown in FIGS. 22 and 23. A modular growth tray 314 is shown, comprising separate growing surface tray 353, a plurality of legs 354 and a light surface 355. The surface tray 353 comprises a rim 350, fluid inlet 340, inductive coils 357, sensors 358 and control or communication interface 356. The legs 354 may be located at the corners and mid-points around the rim 350 of the growing surface tray 353. On top of the legs 354 the light surface 355 is placed. The light surface 355 has lights arranged substantially across the entire surface and directed towards the growing surface tray 353 when the modular growth tray 314 is assembled.

As noted above, fluid inlet(s) 340 are shown in the body of a tray 310, 311, 312, 313, 314, 353 which will now be disused in more detail. Referring to FIGS. 24 and 25 with tray 310 as an example, a rim 350 surrounds the perimeter of the tray 310, 311, 312, 313, 314. A hose (not shown) may be attached to each of the inlets 340. Within the rim 350, there is provided a partition 352 having a series of substantially evenly spaced holes.

In use, when the rim 350 is flooded with fluid via the inlet 340, the fluid spreads around the rim 350 and drips through the holes to the lower level of the rim 350. The fluid then disperses or percolates into a growing mat 14. Thus, the fluid may be introduced to the growing mat 14 all around the perimeter of the tray 310, 311, 312, 313, 314, 353 as a steady trickle, i.e. without gushing so as to unsettle the growth mat 14. The arrangement and operation of the rim 350 is similar to that of an everyday toilet bowl that is gravity fed by a tank above, where the small holes in the partition 352 act as a lip.

A hose 342 may be attached to the inlet 340 for introducing fluid into the tray 310, 311, 312, 313, 314, as shown in FIG. 26. The hose 342 may comprise a magnetic cuff 344 to interface with an electrometric cuff of the fluid inlet 340.

A seal 346 may be arranged between the magnetic cuff 344 and the electromagnetic cuff of the fluid inlet 340 to avoid leakages. The hose 342 further comprises a spring mechanism where the hose 342 is movable between a relaxed position and an engaged position.

As shown in the left hand illustration of FIG. 27a, the hose 342 is engaged with the fluid inlet 340. In the right hand illustration of FIG. 27a, the hose 342 is relaxed and detached from the fluid inlet 340. The hose may be attached automatically using the central control and the magnetic cuff 344 and the electromagnetic cuff of the fluid inlet 340. Of course, the fluid inlet cuff may be magnetic and the hose cuff 344 electromagnetic. Confirmation of attachment of the hose may be communicated to the central control before fluid is allowed to flow into the tray. Confirmation may be detected by a sensor, for example a reed switch. Thus, the fluid supplied to trays 310, 311, 312, 313, 314, may be controlled by the central control system.

A similar hose 342/fluid inlet 340 arrangement is shown in FIG. 27b. However, in this example, trays are arranged either side of a central pillar and hoses 342 extend therefrom. The trays shown are alternative type of tray 311 suitable for placing on a rack and having wheels 366.

Further, hoses 342 may be located at regular intervals along the length of the rack and the inductive coils may also provide power to the electromagnetic hose arrangement. In this way, the trays may be controlled as they move along the rack to connect with the hose 342 when at certain locations.

It will be appreciated that the features described hereinabove may all be used together in a single growth tray. In other embodiments of the invention, some of the features may be omitted. The features may be used in any compatible arrangement.

The hydroponic growing system described above with reference to the figures allows control of the growing environment and thus reduces the risk of microbiological contamination. In addition, the modular nature of the system allows for efficient use of space and ready scalability. The growth trays described herein enable improvements in automation of such systems. Further, the expandable growing space for the plants of the crop reduce the need to thin or replant individual specimens. The length, width and height of the rack units can be chosen to fit the available space. Accordingly crop yields and growing times are improved, contamination is minimised, shelf life is improved and the environmental impact is minimised.

Whilst endeavoring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

The invention claimed is:

1. A growth tray for storing, germinating, propagating and/or growing living organisms, wherein the growth tray is configured as a stackable item and comprises:
a drainage system, the drainage system including:
an inclined growing surface, inclined in a direction to guide fluid towards at least one drainage hole;
a drainage routing structure positioned over the at least one drainage hole, and having:
a down-pipe; and
a connecting routing pipe;
wherein the down-pipe is configured for receiving fluid from an adjacent-above stackable item and transmitting the fluid to an adjacent-below down-pipe or a drain-pipe, and the connecting routing pipe is configured for receiving fluid from an adjacent-above drainage hole and routing the fluid to the down-pipe; and
wherein the growth tray is configured for fluid propagating from the inclined growing surface or an adjacent-above stackable item to be directed through the growth tray to a down-stream point in the drainage system.

2. A growth tray according to claim 1, wherein the growth tray is configured to be arranged in a stack with a plurality of stackable items.

3. A growth tray according to claim 1, wherein the growth tray comprises:
a body; and
two or more stacking legs protruding from a lower surface of the body and arranged around perimeter of the body;
wherein at least one of the two or more stacking legs is located below the drainage routing structure and wherein the down-pipe extends through the at least one stacking leg.

4. A growth tray according to claim 3, wherein stacking legs are located at each corner and at a mid-point of the body.

5. A growth tray according to claim 3, wherein the body of the growth tray comprises:
reinforcement rods, wherein the reinforcement rods are encased within the body of the growth tray.

6. A growth tray according to claim 1, wherein the growth tray comprises:
one or more lifting structures configured for lifting the growth tray.

7. A growth tray according to claim 6, wherein each lifting structure is included as a structural feature of the drainage routing structure or each lifting structure is included as a feature of the growth tray body; or
wherein each lifting structure is located at one or more corner(s) of the growth tray.

8. A growth tray according to claim 1, wherein the inclined growing surface comprises:
a plurality of ribs providing a plurality of drainage channels therebetween.

9. A growth tray according to claim 1, comprising:
a drainage gutter substantially centrally located; and the inclined growing surface include:
opposed first and second surfaces directed to drain into the drainage gutter; or
wherein the drainage gutter is located along one side of the growth tray and the inclined growing surface include a single surface directed to drain into the gutter.

10. A growth tray according to claim 1, in combination with a light box, wherein the light box is configured as a stackable item, the light box comprising:
a frame structure having legs locatable on the perimeter of the growth tray; and a surface including lights on an underside, wherein the light box is configured and arranged to be stacked as a lid to the growth tray.

11. A growth tray and light box according to claim 10, wherein the light box is configured and arranged to interface with the drainage system of the growth tray or another stacked item adjacent-above or adjacent-below the light box, and wherein the legs include:
a hollow tube to provide a continuous down-pipe.

12. A growth tray and light box according to claim 10, comprising:
a lattice structure which extends between two or more legs of the frame structure.

13. A growth tray and light box according to claim 12, wherein the lattice structure is configured to be adaptable to match a length of the legs.

14. A modular growth tray system tray for storing, germinating, propagating and/or growing living organisms, the modular growth tray system comprising:
at least one or more growth trays according to claim 1, stacked with:
at least one light box.

15. A modular growth tray system according to claim 14, wherein light box comprises:
legs which are interchangeable.

16. A modular growth tray system according to claim 14, wherein the legs are configured to be extendable in length between a first height and a second height.

17. A hydroponic system for storing, germinating, propagating and or growing living organisms, the hydroponic system comprising:
at least one or more growth tray(s) according to claim 1, configured for providing at least one service to a crop in a high-care facility.

18. The system according to claim 17, wherein the service provided is integrated in the one or more growth tray(s) and is one or more of:
fluid drainage; lighting; automated movement; fluid delivery; tray reconfiguration; tray or stack rearrangement; and/or air-flow control.

19. The system according to claim 17, wherein the drainage system comprises:
a drain-pipe located adjacent-below the lower-most one or more growth trays and wherein the one or more growth trays will drain into the drain-pipe.

20. The system according to claim 17, wherein two or more stackable items are arranged in a stack, in combination with growth trays on a rack having tracks.

21. The system according to claim 17, configured and arranged such that fluid collected by the drainage system will be recirculated to a filtration, nutrient recovery and/or fluid mixing system, for re-use.

22. The system according to claim 17, wherein the system comprises:
at least one load handling device for relocating one or more growth trays and/or stacks.

23. The system according to claim 17, comprising:
a central control system.

24. The system according to claim 23, wherein the central control system is configured to control one or more of: fluid introduction into one or more growth trays; drainage of run-off fluid; recirculation of fluid; lighting; movement of growth trays; rearrangement of growth trays; hose attachment to a fluid inlet; increasing a height above growth surfaces(s); environmental control; air conditioning; temperature control; and/or one or more load handling devices.

25. The system according to claim 17, wherein the high-care facility is substantially self-contained.

26. A method according to claim 25, comprising:
attaching a hose to the one or more growth trays and controlling fluid provided to the plurality of living organisms; or
attaching a hose to the one or more growth trays and providing cleaning fluid to at least one of the one or more growth trays.

27. A method according to claim 25, comprising:
maturity transferring or relocating the one or more growth trays to a harvest area and harvesting the crop, when the living organisms have grown.

28. A method of storing, germinating, propagating and/or growing a plurality of living organisms in a modular growth system having one or more growth trays for storing, germinating, propagating and/or growing living organisms, wherein each growth tray is configured as a stackable item and includes:
a drainage system, having:
an inclined growing surface, inclined in a direction to guide fluid towards at least one drainage hole;
a drainage routing structure positioned over the at least one drainage hole, and the drainage routing structure having a down-pipe and a connecting routing pipe, wherein the down-pipe is configured for receiving fluid from an adjacent-above stackable item and transmitting the fluid to an adjacent-below down-pipe or a drain-pipe, and the connecting routing pipe is configured for receiving fluid from an adjacent-above drainage hole and routing the fluid to the down-pipe; and wherein each growth tray is configured for fluid propagating from the inclined growing surface or an adjacent-above stackable item to be directed through the growth tray to a down-steam point in the drainage routing structure, the method comprising:
providing at least one growing medium prepared with at least one of seeds and seedlings of a living organism;
placing each of the at least one growth medium(s) are placed on the one or more growth trays; and
providing at least one of the seeds and seedlings of the living organism with services to enable propagation and/or growth.

29. A method according to claim 28, comprising:
arranging the one or more growth trays in a stack with other stackable items or on a rack.

30. A method according to claim 29, comprising:
moving the one or more growth trays along a track using inductive loops.

31. The method according to claim 29, wherein a crop produced has reduced or substantially negligible Pyrrolizidine Alkaloid-s, PAs.

* * * * *